United States Patent
Ding et al.

(10) Patent No.: US 9,805,324 B2
(45) Date of Patent: Oct. 31, 2017

(54) COMPUTER-IMPLEMENTED SYSTEM FOR MODELING AN ALLOCATED RESOURCE

(71) Applicant: SAS Institute Inc., Cary, NC (US)

(72) Inventors: Bingfeng Ding, Cary, NC (US); Feng Chen, Apex, NC (US); Kevin L. Scott, Raleigh, NC (US); Metin Balikcioglu, Cary, NC (US); Tugrul Sanli, Cary, NC (US); Xiaodong Yao, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/264,256

(22) Filed: Sep. 13, 2016

(65) Prior Publication Data

US 2017/0078221 A1  Mar. 16, 2017

Related U.S. Application Data

(60) Provisional application No. 62/219,314, filed on Sep. 16, 2015.

(51) Int. Cl.
  *G06Q 10/06* (2012.01)
  *H04L 12/911* (2013.01)
  *G06Q 10/04* (2012.01)
  *G06Q 30/02* (2012.01)

(52) U.S. Cl.
  CPC ....... *G06Q 10/06312* (2013.01); *G06Q 10/04* (2013.01); *G06Q 10/06* (2013.01); *G06Q 10/0631* (2013.01); *G06Q 30/0202* (2013.01); *H04L 47/823* (2013.01)

(58) Field of Classification Search
  CPC ............. H04L 41/0816; H04L 67/1031; H04L 67/1012; H04L 47/823; G06Q 10/06; G06Q 10/10; G06Q 10/04; G06Q 10/0631; G06Q 10/06312; G06Q 30/0202
  See application file for complete search history.

(56) References Cited

U.S. PATENT DOCUMENTS

| 6,016,503 A * | 1/2000 | Overby, Jr. ............... G06F 9/50 370/229 |
| 6,183,362 B1 | 2/2001 | Boushy |
| 7,073,177 B2 * | 7/2006 | Foote ........................ G06F 9/50 714/E11.178 |
| 7,212,978 B2 | 5/2007 | Kowal et al. |
| 7,328,166 B1 | 2/2008 | Geoghegan et al. |
| 7,617,136 B1 | 11/2009 | Lessing et al. |
| 8,321,286 B2 | 11/2012 | McDaniel et al. |
| 8,600,787 B2 | 12/2013 | Fox et al. |
| 2002/0072999 A1 | 6/2002 | Andres et al. |
| 2004/0158536 A1 * | 8/2004 | Kowal ................... G06Q 10/02 705/400 |

(Continued)

*Primary Examiner* — Ramy M Osman

(57) ABSTRACT

Exemplary embodiments are generally directed to methods, mediums, and systems for accounting for extensions or reductions of the period for which a resource (e.g., computer processor time, scientific apparatus, storage units, devices, etc.) is allocated. According to exemplary embodiments, allocation-based aggregated effects of extension and relinquishment are modeled. The modeled effects are used to offset allocation forecasts based on historical data. As a result, the dimensionality of the problem of incorporating in-house data is greatly reduced as compared to other techniques, and allocation forecasts can be made more accurately and efficiently.

27 Claims, 21 Drawing Sheets

(56) References Cited

U.S. PATENT DOCUMENTS

| | | | |
|---|---|---|---|
| 2004/0196740 A1* | 10/2004 | Sachedina | G06Q 10/06 368/46 |
| 2005/0228707 A1* | 10/2005 | Hendrickson | G06Q 10/06 705/7.14 |
| 2006/0013229 A1* | 1/2006 | Johansson | H04L 47/70 370/395.41 |
| 2006/0085246 A1* | 4/2006 | Li | G06Q 30/0202 705/7.31 |
| 2008/0244601 A1* | 10/2008 | Zeis | G06F 9/5011 718/104 |
| 2009/0172035 A1 | 7/2009 | Lessing et al. | |
| 2009/0183218 A1* | 7/2009 | Li | H04N 21/23103 725/114 |
| 2009/0199192 A1* | 8/2009 | Laithwaite | G06Q 10/06 718/104 |
| 2009/0249350 A1* | 10/2009 | Senders | G06Q 10/10 718/104 |
| 2010/0094770 A1* | 4/2010 | Sachedina | G06Q 30/0202 705/348 |
| 2010/0131959 A1* | 5/2010 | Spiers | G06F 9/50 718/105 |
| 2010/0198609 A1* | 8/2010 | Mellin | G06Q 10/06 705/2 |
| 2010/0199285 A1* | 8/2010 | Medovich | G06F 9/45533 718/104 |
| 2011/0191565 A1* | 8/2011 | LeGendre | G06F 12/02 711/171 |
| 2012/0116844 A1 | 5/2012 | Menich et al. | |
| 2014/0136458 A1* | 5/2014 | Levin | G06Q 10/06312 706/21 |
| 2014/0222518 A1* | 8/2014 | Adkins | G06Q 30/0206 705/7.35 |
| 2015/0081877 A1* | 3/2015 | Sethi | H04L 67/1031 709/224 |
| 2015/0149097 A1* | 5/2015 | Wada | G06Q 10/04 702/45 |
| 2015/0161526 A1 | 6/2015 | Yalcin et al. | |
| 2015/0161528 A1 | 6/2015 | Yalcin et al. | |
| 2015/0242944 A1* | 8/2015 | Willard | G06Q 30/0284 705/5 |
| 2015/0256476 A1* | 9/2015 | Kurtzman | H04L 47/70 709/226 |
| 2015/0312124 A1* | 10/2015 | Curtin | H04L 67/1097 709/224 |
| 2016/0127184 A1* | 5/2016 | Bursell | H04L 67/303 709/221 |
| 2017/0068484 A1* | 3/2017 | Scott | G06Q 10/0631 |

* cited by examiner

COMPUTER-IMPLEMENTED SYSTEM FOR MODELING AN ALLOCATED RESOURCE

CROSS-REFERENCE TO RELATED APPLICATIONS

This application claims the benefit of priority under 35 U.S.C. §119(e) to U.S. Provisional Application Ser. No. 62/219,314 filed Sep. 16, 2015, the entirety of which is incorporated herein by reference.

BRIEF DESCRIPTION OF THE DRAWINGS

The present disclosure is described in conjunction with the appended figures.

DETAILED DESCRIPTION

Figure 1:
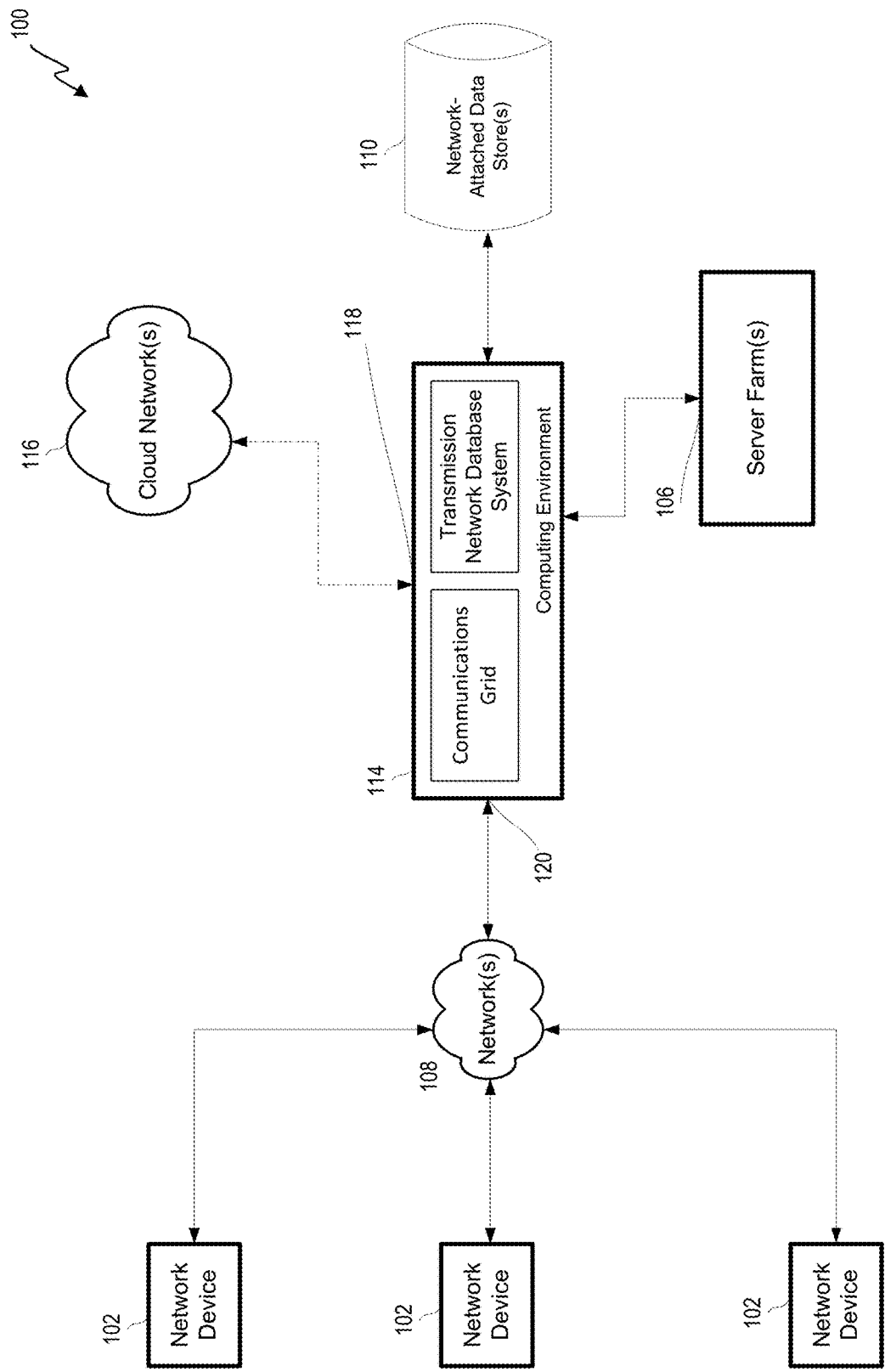
FIG. 1 illustrates a block diagram that provides an illustration of the hardware components of a computing system, according to some embodiments of the present technology.

With general reference to notations and nomenclature used herein, portions of the detailed description that follows may be presented in terms of program procedures executed by a processor component of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatuses may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
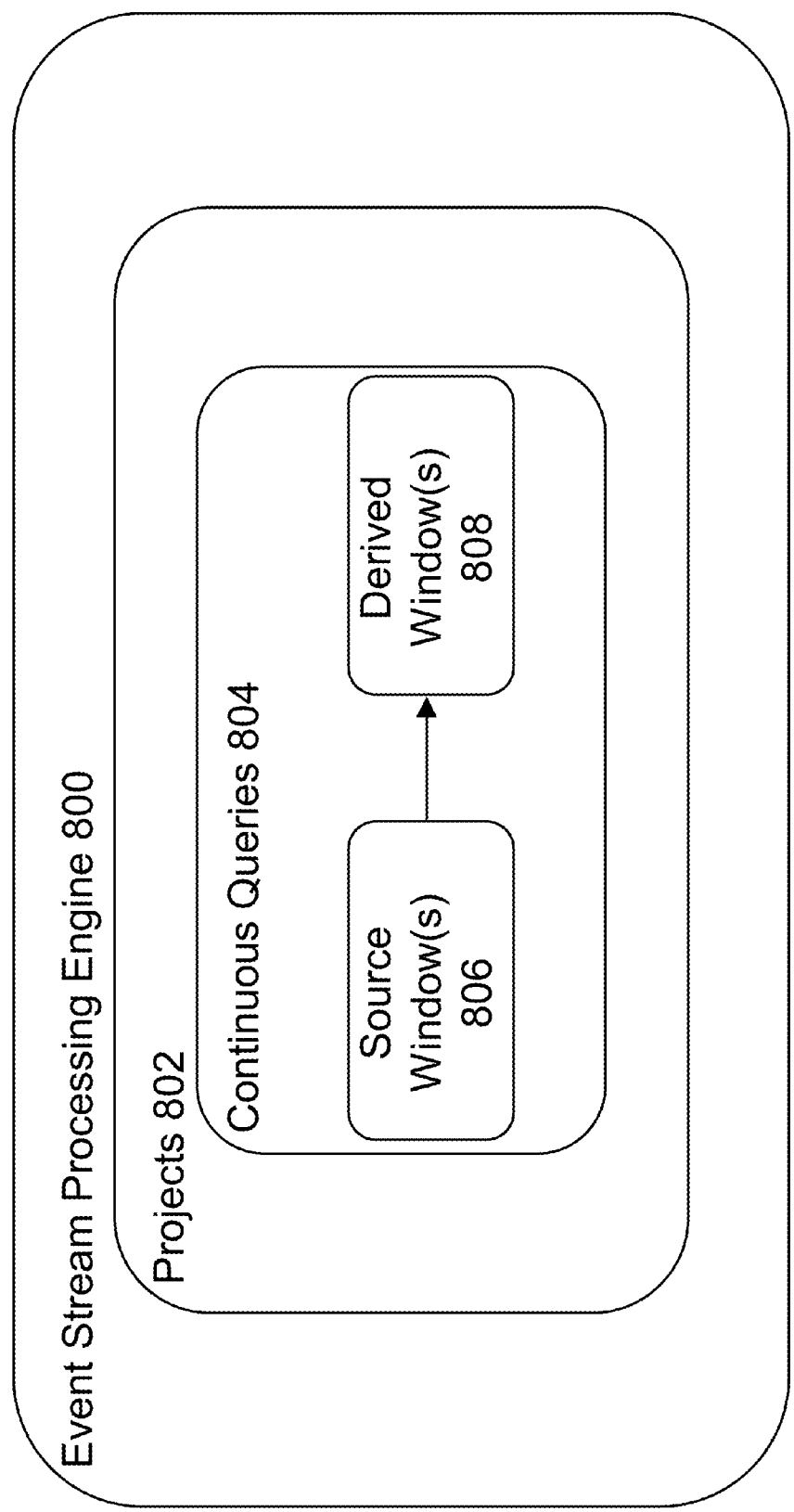
FIG. 8 illustrates a block diagram including components of an Event Stream Processing Engine (ESPE), according to embodiments of the present technology.
Figure 9:
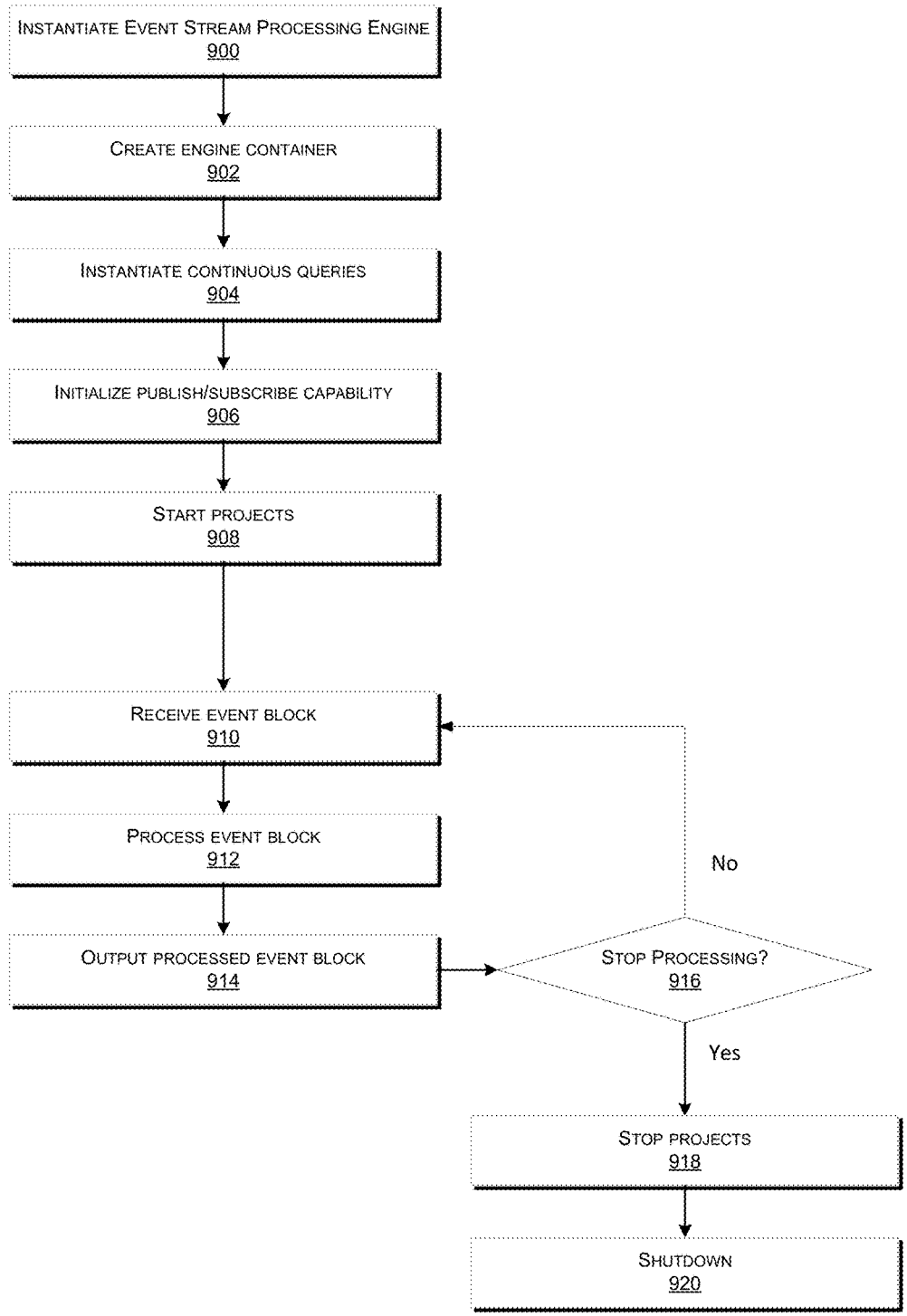
FIG. 9 illustrates a flow chart showing an example process including operations performed by an event stream processing engine, according to some embodiments of the present technology.
Figure 10:
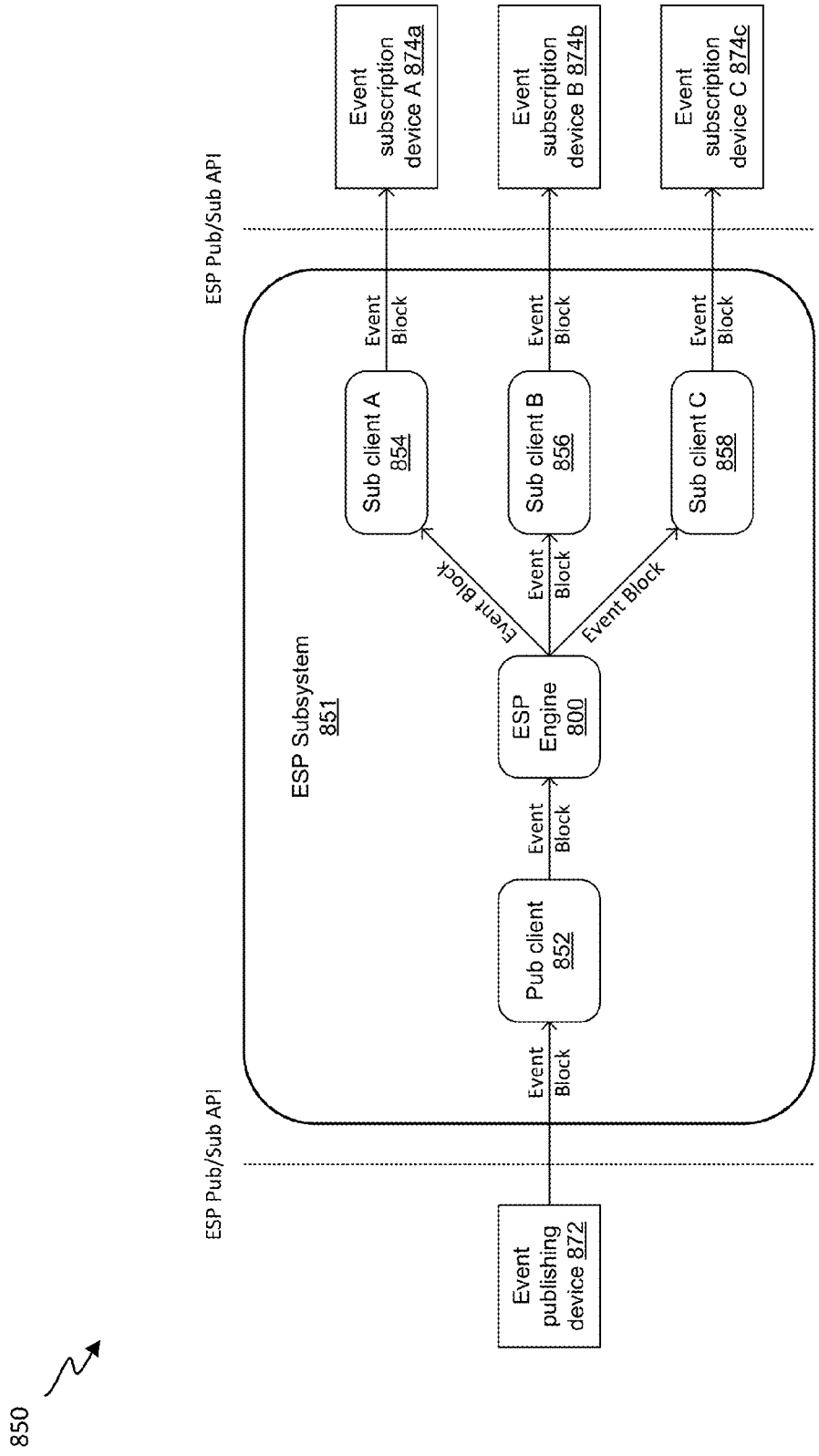
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
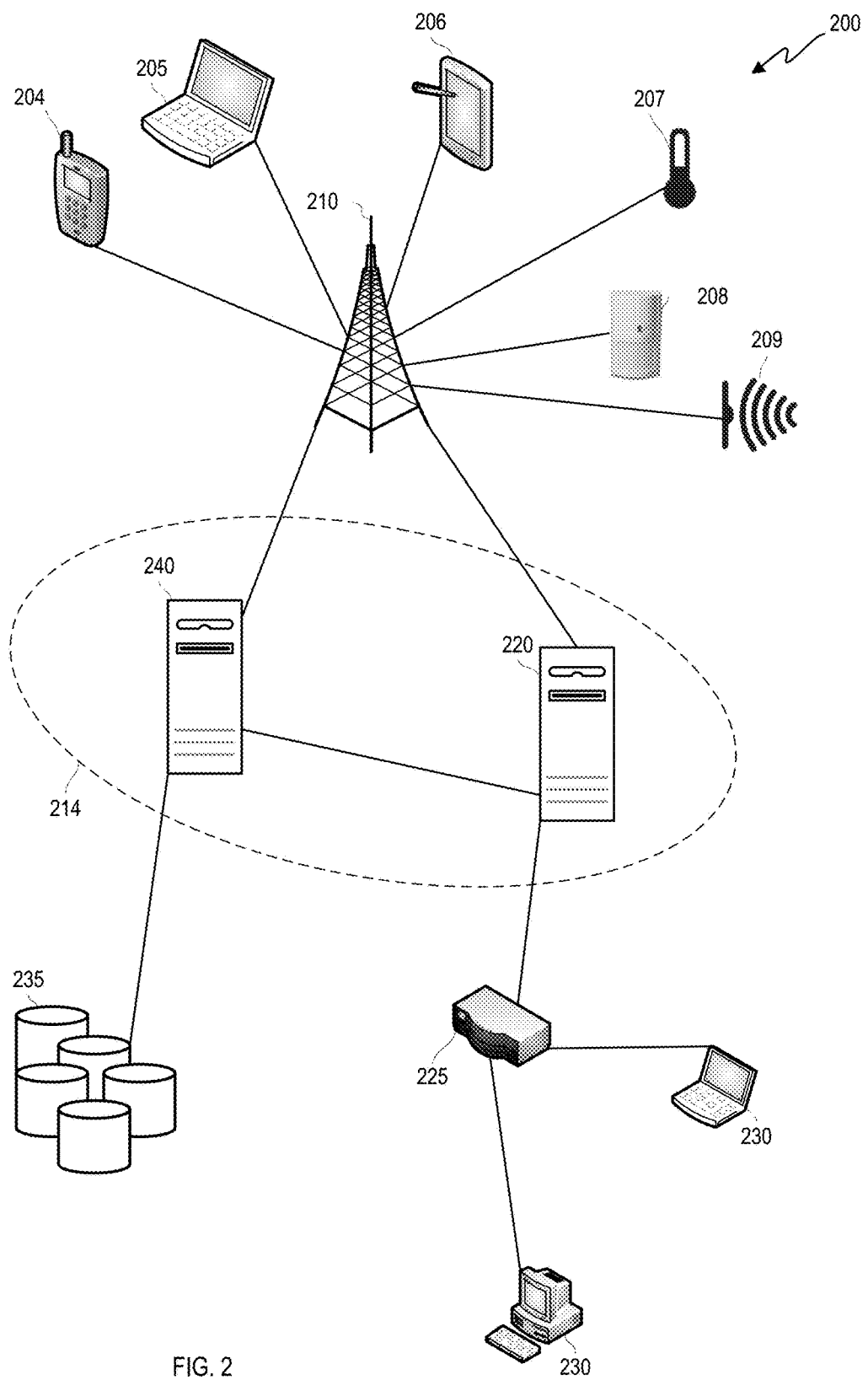
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers/users, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
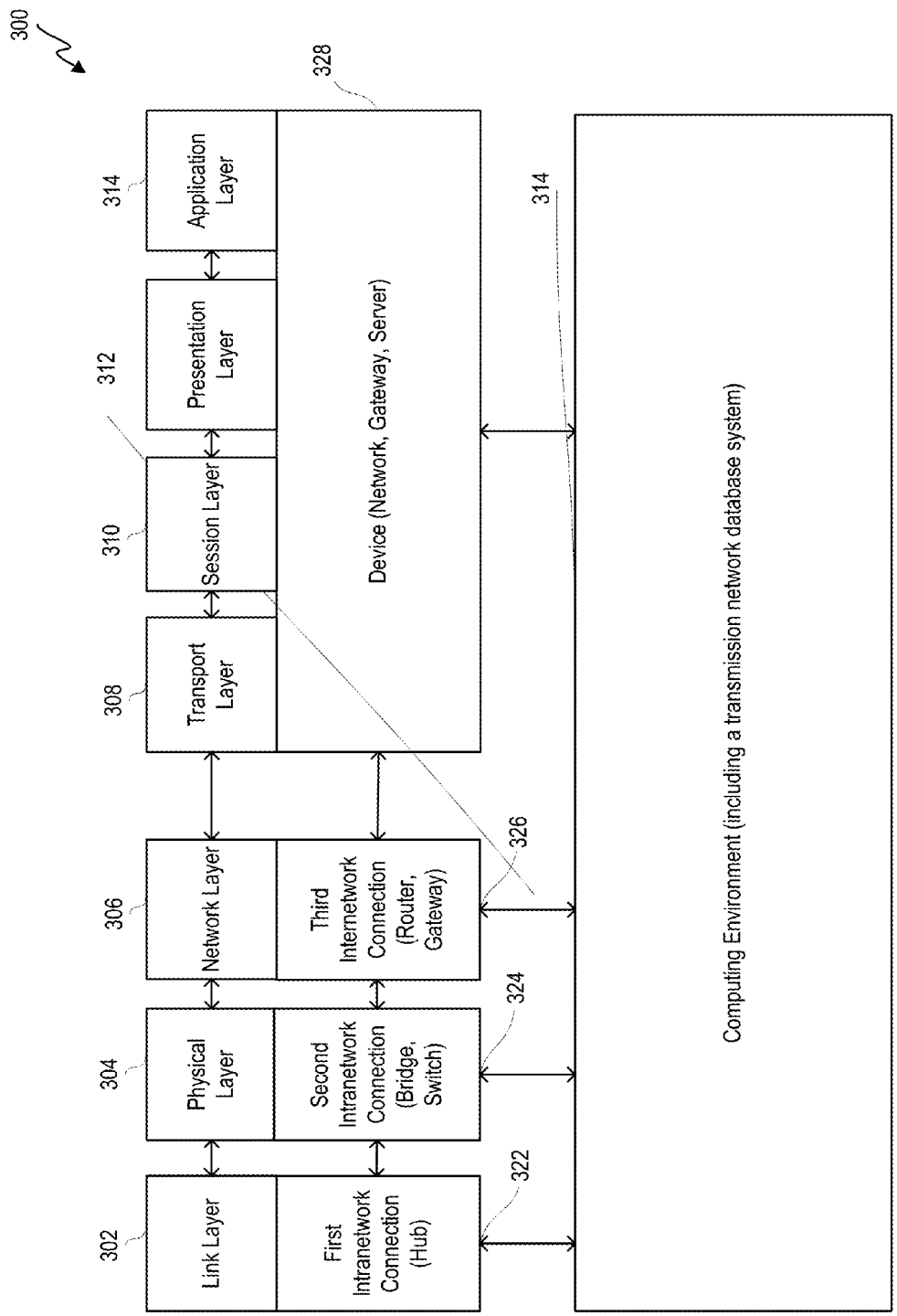
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory.

Each node may be assigned a particular task such as a portion of a processing project, or to organize or control other nodes within the grid.

Figure 4:
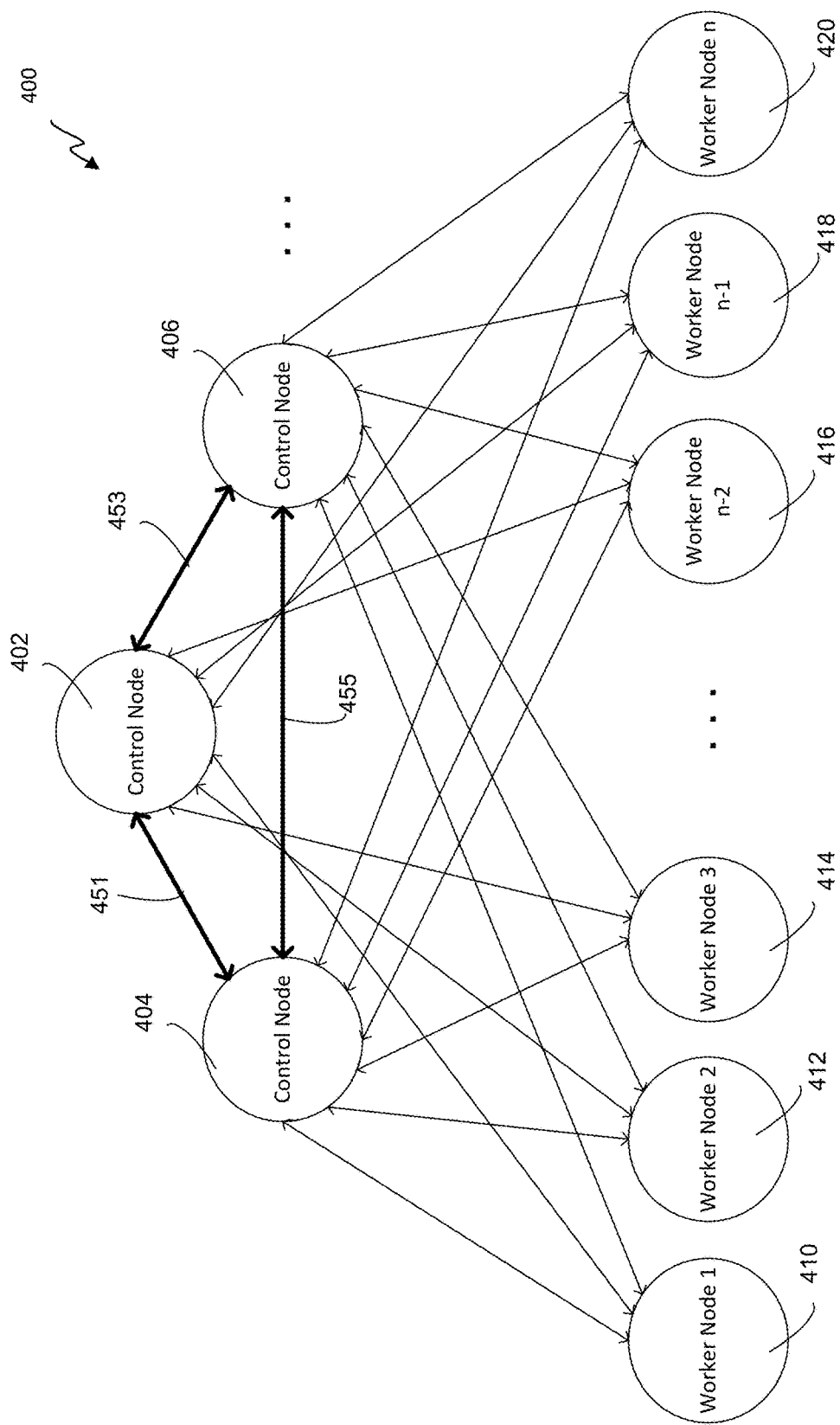
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may send periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
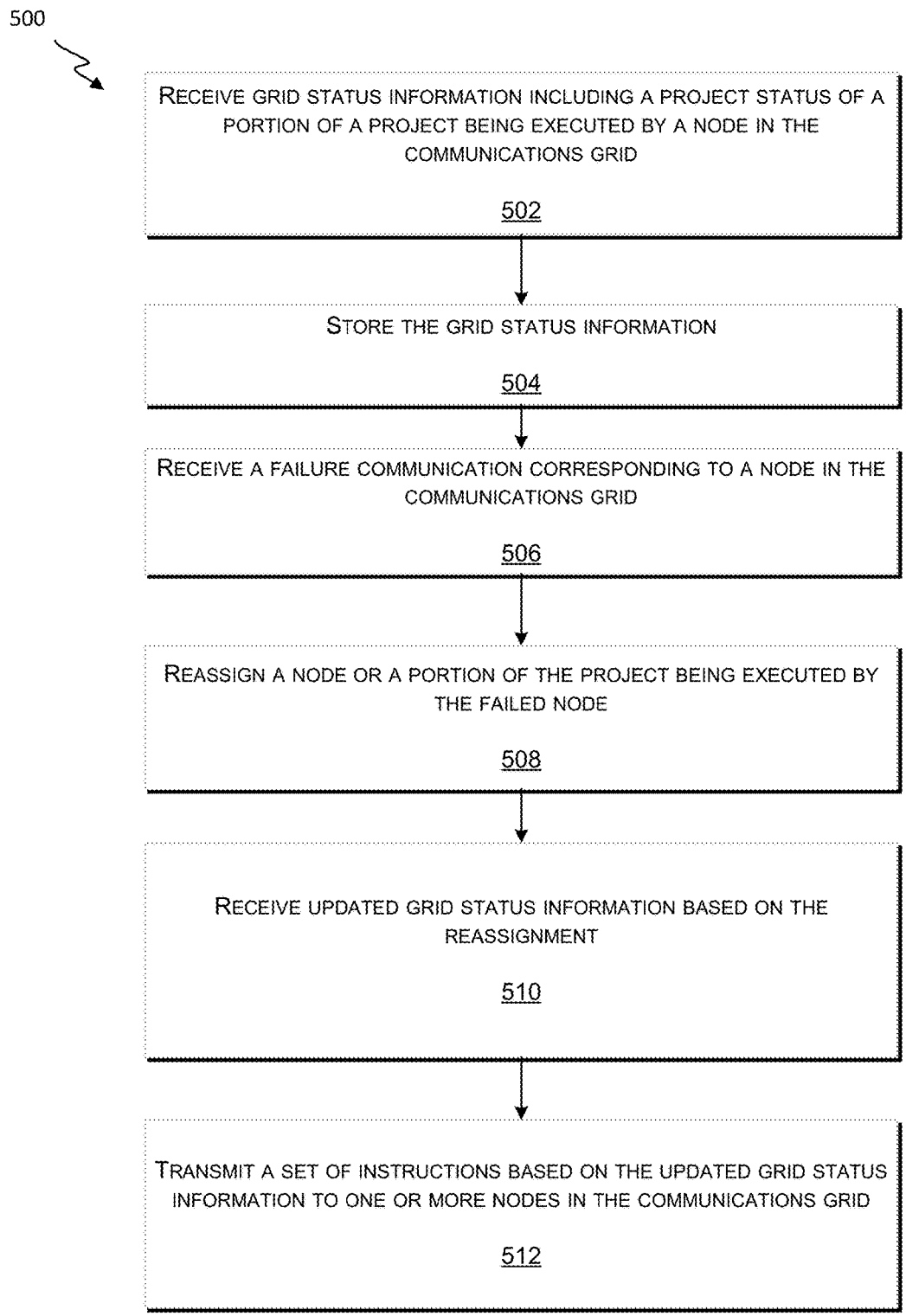
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
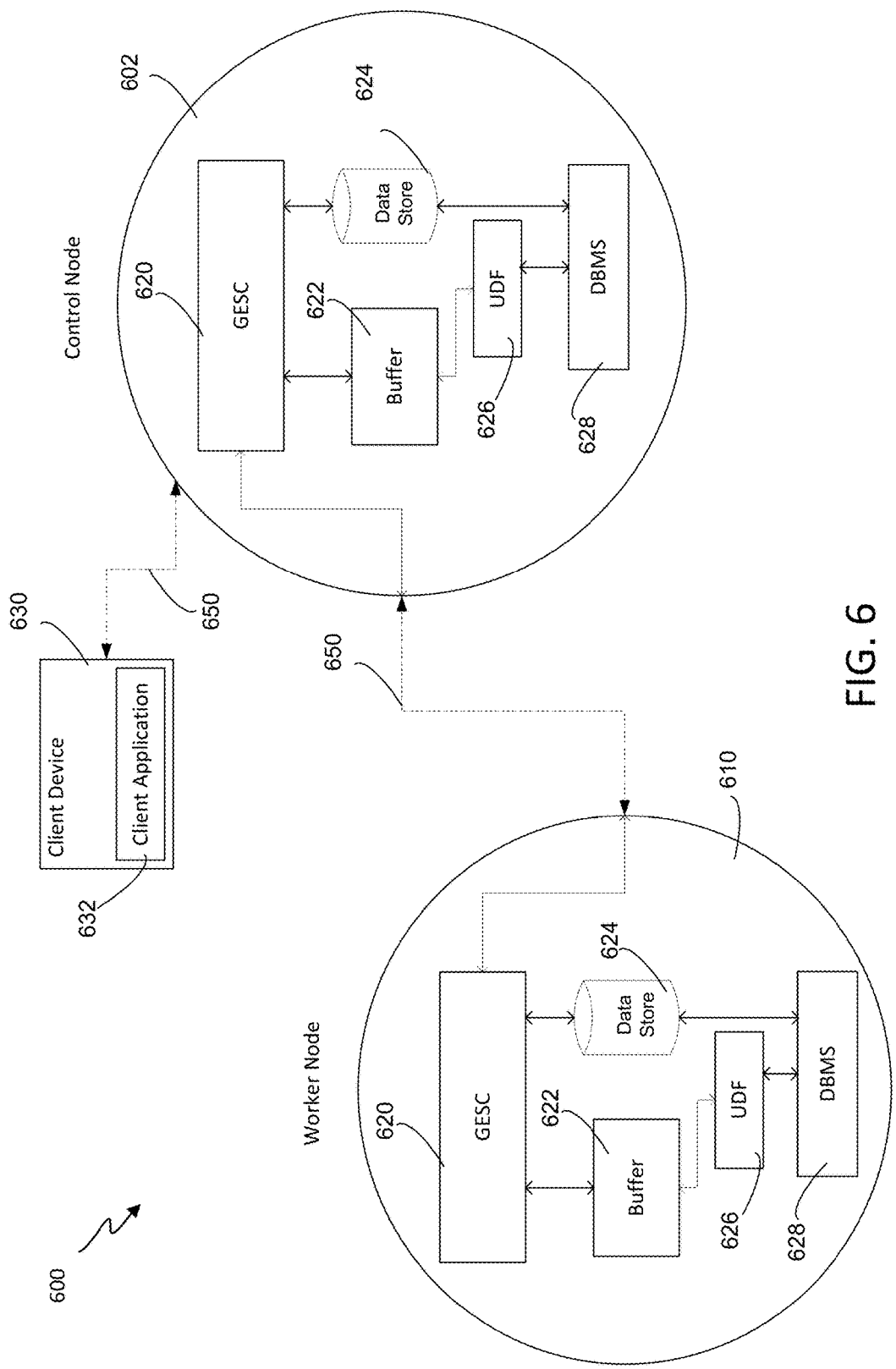
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
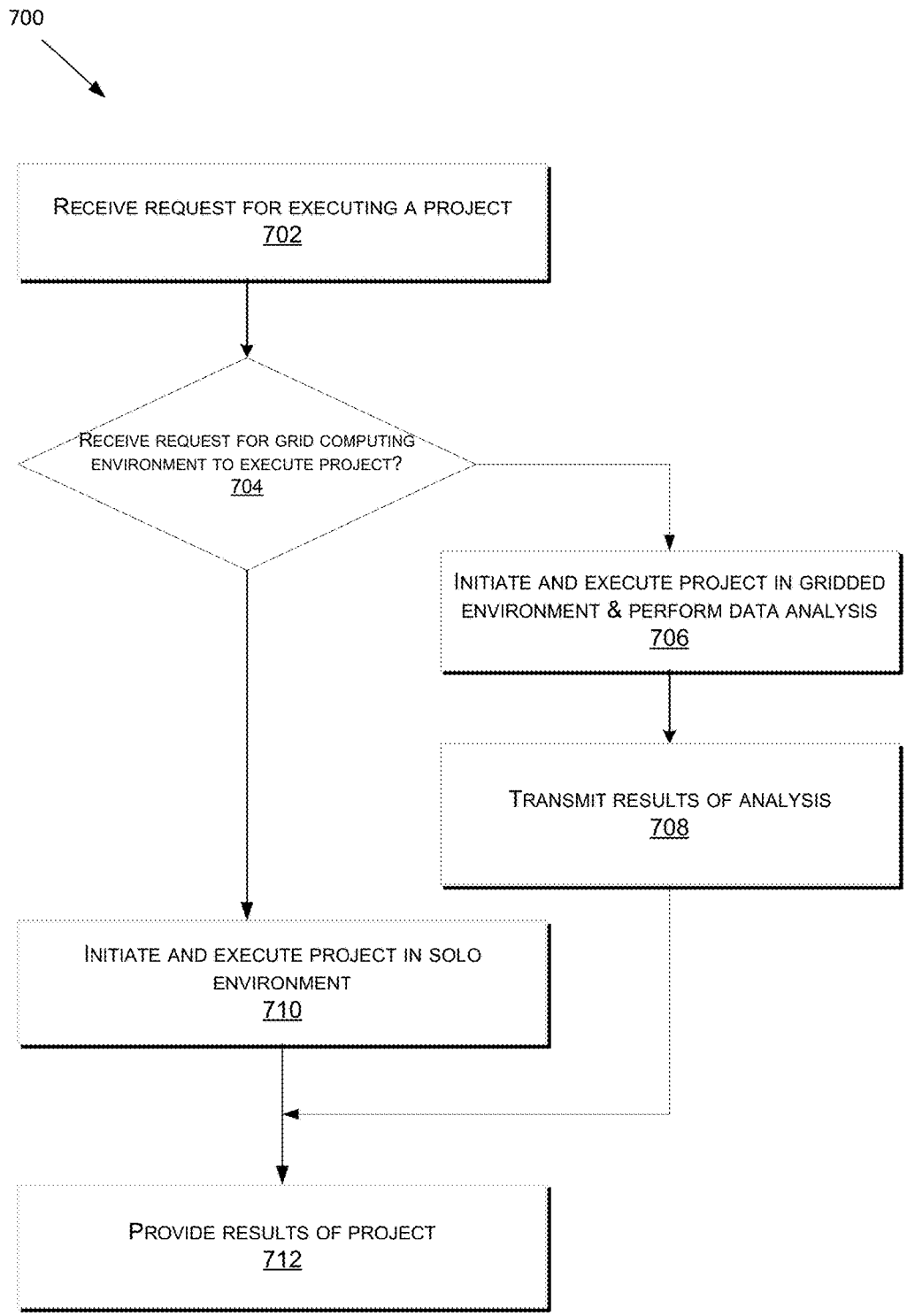
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874a-c, according to embodiments of the present technology. ESP system 850 may include ESP device or subsystem 851, event publishing device 872, an event subscribing device A 874a, an event subscribing device B 874b, and an event subscribing device C 874c. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874a, event subscribing device B 874b, and event subscribing device C 874c. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874a, event subscribing device B 874b, and event subscribing device C 874c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874a, event subscribing device B 874b, and event subscribing device C 874c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874a using the publish/subscribe API. Subscribing client B 856 may be started by an event subscription application B executing at event subscribing device B 874b using the publish/subscribe API. Subscribing client C 858 may be started by an event subscription application C executing at event subscribing device C 874c using the publish/subscribe API.

An event block object containing one or more event objects is injected into a source window of the one or more source windows 806 from an instance of an event publishing application on event publishing device 872. The event block object may generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874a, event subscription device B 874b, and event subscription device C 874c. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874a-c. For example, subscribing client A 804, subscribing client B 806, and subscribing client C 808 may send the received event block object to event subscription device A 874a, event subscription device B 874b, and event subscription device C 874c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

According to exemplary embodiments, the above-described systems may accommodate extension effects in a policy management procedure by incorporating in-house modifications to a resource allocation. This allows the policy management procedure to provide better policies that are used to allocate the resource. It is noted that, although the terms "extension" and "extension effects" is used in a number of examples described below, the present technology is envisioned to encompass modifications that extend and/or reduce the amount of time that a resource is allocated.

Furthermore, exemplary embodiments describe allocation of units of a "resource." It is noted that a resource may encompass any entity having a finite or limited number of units available for allocation. For instance, real-world physical examples of such limited resources can include allocation time for library books, scientific instruments (e.g., telescopes, particle accelerators, etc.), journalists in a particular region, computer processing or data storage resources, hotel rooms, airline seats, parking spaces, autonomous and non-autonomous ride hailing vehicles, seats at a sports event or other show, hospital beds, classroom seating capacity, an amount of allowable patients in clinical research trials, an amount of a mined element available to manufacture an electrical device, an amount of viable wells for oil drilling, etc.

Such a resource may be allocated to a user on a unit-by-unit basis. The unit(s) of the resource may be allocated for a given period of allocation time, starting when the resource is allocated to the user and ending when the user relinquishes the resource. In some cases, the administrator of the resource may allow the user to cancel their use of the resource, extend their use of the resource, or relinquish the resource early. For example, a person who has checked out a library book may request to keep the book for an extra week. Similarly, a hotel guest might request that their reservation be shortened after they check in. A change in time that the user relinquishes the resource is referred to as in-house activity.

When setting policies relating to use of the resource (e.g., the amount of time that the resource may be reserved, a level of overbooking tolerated for the resource, an amount required to reserve the resource or modify the reservation, how many units of the resource to maintain, etc.), it may be important to understand and forecast the behavior of a current "in-house" user. This understanding/forecasting may be used to better understand the available remaining capacity of the resource, and to control demand for the resource accordingly.

Policy management systems, which are used to help make these decisions, typically address user behavior before the resource is allocated to the user and often overlook in-house activities. However, if these activities are not taken properly into account, they may lead to significant forecast bias. Therefore, it is desirable to incorporate extension requests into policy management systems in order to correctly forecast demand and set appropriate policies and controls for the resource.

One way to incorporate the extension and early relinquishment behavior in a policy management system is to first estimate the conditional probabilities of in-house extensions and early relinquishments from all possible original allocation periods to all possible extended or shortened allocation periods based on the amount of time until the originally-intended relinquishment, and further using these estimates to predict the in-house extension and early relinquishment behavior. This direct modeling approach, however, is associated with a number of issues:

- The conditional probabilities have to be estimated for both extensions and early departures at each possible combination of original allocation period, updated allocation period (extended or shortened) and days to intended relinquishment level for each user segment. The available data may be extremely sparse to allow for the estimation of the conditional probabilities efficiently and accurately. In addition, the number of probabilities to be estimated grows exponentially with the alternative number of allocation periods. It may not be efficient to estimate all the probabilities.
- Due to the interaction effects of different patterns, hierarchical estimation may not be feasible.
- Extension patterns may also vary due to seasonality and be influenced by special events. Unlike regular policy management system demand patterns, these events affect in-house behavior with a time lag due to the nature of extensions. Incorporating the lag effects may not be possible with a conditional probability approach.
- Forecasting systems need to compensate for multiple extensions of the same user.
- Policy management system optimization algorithms must incorporate the conditional behavior after the resource is allocated using the huge number of conditional probabilities that are estimated.

Instead of arrival-based direct modeling of in-house activity, an alternative approach to incorporate the in-house behavior would be to model and offset the allocation-based aggregated effects of the in-house extension and early relinquishment. Embodiments of the present application provide techniques to incorporate in-house activity into policy management systems based on this technique.

Figure 11:
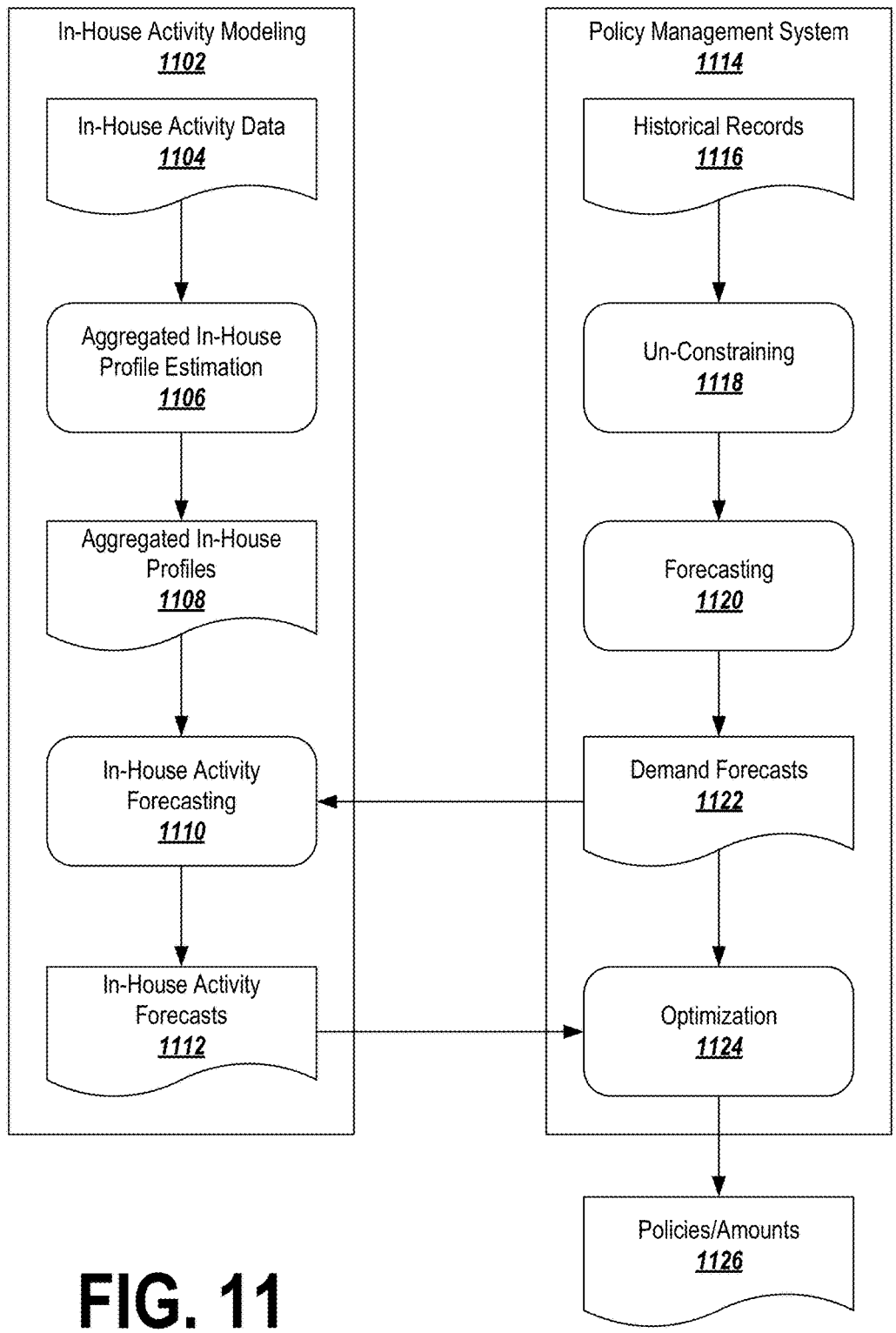
FIG. 11 illustrates an example of an in-house activity modeling system interacting with a policy management system.

FIG. 11 depicts an example of in-house activity modeling 1102 as applied in conjunction with a policy management system 1114.

The policy management system 1114 may rely on historical records 1116. The historical records 1116 may include records of requests to allocate the resource (e.g., requests to check out a library book or book a hotel room). The historical records 1116 may omit records pertaining to in-house activities such as allocation modifications.

This historical records 1116 may be subjected to an un-constraining process 1118. Data is constrained when the data excludes some historical transactions. For example, some customers that would otherwise purchase one of the limited resources may be turned away due to lack of capacity. Thus, if projections are made based on the uncorrected constrained data, the projection will be inaccurate to the extent that it fails to consider the constrained or excluded transactions.

Accordingly, the data may be un-constrained in order to estimate the number and/or nature of excluded transactions. One suitable technique for un-constraining data is described in U.S. patent application Ser. No. 15/257,545, filed on Sep. 5, 2016 and entitled "Computer-Implemented System for Hierarchical Unconstraining in Data Processes."

The un-constrained data may be used for forecasting 1120. Forecasting 1120 may predict an amount of demand for the resource (e.g., the probability that a unit of the resource will be allocated at a given time, or the predicted amount of time before a requested allocation data on which a request will be received to allocate the resource). Forecasting 1120 may be performed for the entire user base of a resource, or for categories or subsets of the user base (e.g., academic vs. non-academic library book requestors, leisure vs. non-leisure travelers, etc.)

The forecasting procedure 1120 may create one or more demand forecasts 1112 describing the predicted demand for the resource. However, as noted above, the historical records 1116 used to generate the demand forecasts 1112 typically do not take into account in-house activities. Thus, the demand forecasts 1112 may be biased for or against allocation of the resource at a given time (depending on whether allocation extensions or allocation reductions predominate the in-house activity).

Therefore, it may be desirable to modify the demand forecasts based on in-house activity. To this end, in-house activity modeling 1102 may be performed.

The in-house activity modeling 1102 may rely on in-house activity data 1104. The in-house activity data may include one or more records of in-house activity (e.g., records of requests to extend a period of resource allocation or reduce a period of resource allocation, where the request is made after the resource is allocated; examples include requests to extend a check-out period for a library book or extend a stay in a hotel room). The in-house activity data 1104 may include explicit records of the requests for allocation modifications, or implicit records (e.g., by recording the date/time at which a resource was intended to be relinquished and the date/time that the resource was actually relinquished).

The in-house activity data 1104 may be used to generate aggregated in-house profiles 1108 through an aggregated in-house profile estimation process 1106. The aggregated in-house profile estimation process 1106 may involve aggregating the records of the in-house activity data 1104, and using the aggregated records to develop one or more aggregated in-house profiles 1108 that describes extension effects in the in-house activity data 1104.

In some embodiments, the in-house activity data 1104 data is modeled at a higher level of granularity than the individual transaction or supplied resource. For example, instead of modeling the data at the level of an individual record such as a hotel room, data is modeled at a higher hierarchical level, such as for an entire hotel or group of hotels. The aggregated demand may then be pro-rated over a group of categories or customers.

By aggregating and then pro-rating the data, modification requests by a given category of users that might be small or nonexistent over a certain time frame may be better accommodated. Moreover, it may be easier or more efficient to make assumptions at the aggregate level, rather than at the user level. This is particularly true when considering a limited resource divided into a number of units. The resource may have, for example, 100 units, and it may be simpler to estimate that about half of the units will be allocated to a certain class of users and half will be allocated to another group of users, rather than trying to make predictions about individual resource units.

The aggregated data may be used to generate one or more aggregated in-house profiles 1108. The aggregated in-house profiles 1108 model the impact of the conditional probability distribution patterns of allocation extensions and allocation reductions, on allocation period (e.g., number of days a library book is checked out, number of room-nights in a hotel, etc.) as a function of time-to-allocation (e.g., number of days until the library book is checked out or until a guest checks into the hotel room.

The aggregated in-house profile 1108 may be estimated by aggregating individual extension and reduction behaviors. The aggregated behavior then is normalized to produce the in-house profile 1108. In this occupancy-based approach, calibration is performed on the historical transaction level in-house activity data and takes into account the impact the date on which the modification was requested, the original amount of the allocation period, and the updated (extended or shortened) amount of the allocation period.

The aggregated in-house profile 1108 is an attempt to collapse the multiple dimensions of time until allocation and amount of allocated time to a single dimension of allocation period and time-to-allocation. The profile itself may be, for example, the average percentage of allocation period that is generated by the in-house activity.

The aggregated in-house profiles 1108 may be subjected to an in-house activity forecasting process 1110. In conjunction with the demand forecasts 1112, the in-house activity forecasting 1110 may attempt to determine the probability that a given unit of the resource will be allocated at a given time. The in-house activity forecasting process 1110 may output one or more in-house activity forecasts (e.g., a prediction of the likelihood that the unit of the resource will be allocated).

At block 1124, the demand forecasts 1122 may be combined with the in-house activity forecasts 1112 by the policy management system 1114 to perform an optimization process. The optimization process 1124 may determine one or more policies 1126, in view of the demand forecasts 1112 and the in-house activity forecasts 1112, that would optimize a parameter associated with the resource (e.g., minimizing the number of unused units of the resource, maximizing the total amount users contribute when requesting allocation of the resource, minimizing wear-and-tear on units of the resource, maximizing utility of the resource, etc.).

It is noted that optimization 1124 may involve making a good or better decision in view of available information, and does not necessarily require that the policy management system 1114 reaches an optimal or the best possible decision.

One example of a policy 1126 is a determination of how many units of the resource to make available, and when to make those units available. For example, FIGS. 12A-12C depict an example of policy-setting in the context of the hospitality industry.

Figure 12A:
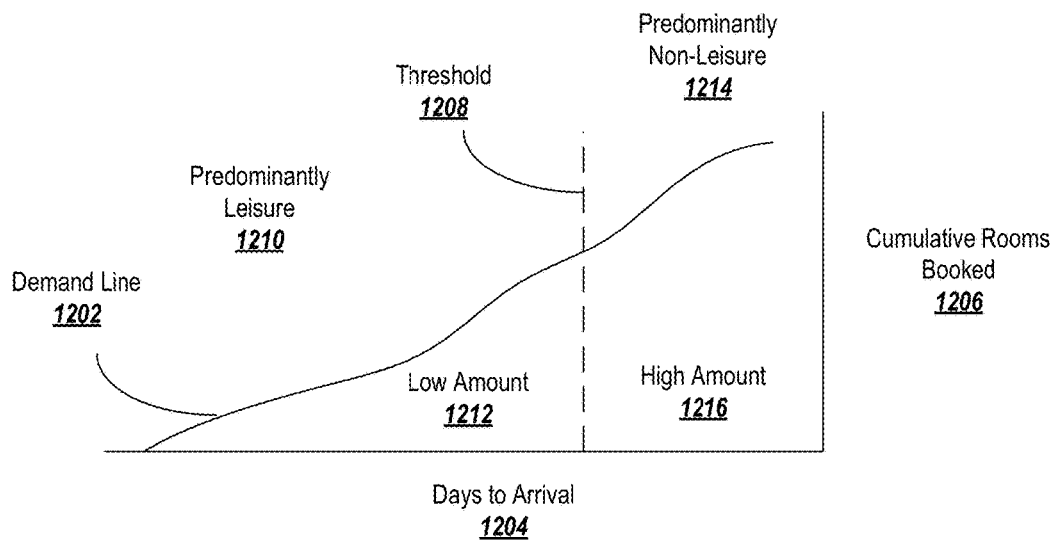
FIGS. 12A-12C illustrate examples of resource allocations in view of exemplary resource unit demand, according to some embodiments of the present technology.
Figure 12B:
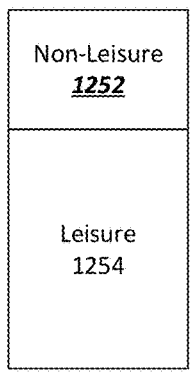
Figure 12B:
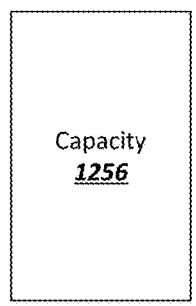
Figure 12C:
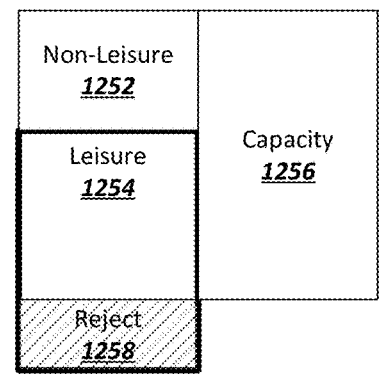

FIG. 12A is an illustrative graph depicting a demand line 1202 that indicates a number of cumulative bookings 1206 for resource units such as hotel rooms based on the number of days 1204 until the start date of the reservation. As shown in the graph, there is a threshold date 1208, before which demand is predominated by leisure bookings 1210 (e.g., vacation travelers). Because leisure travelers may be less willing to pay high amounts as compared to non-leisure travelers, a low amount region 1212 may be defined prior to the threshold date 1208. Bookings made before the threshold date 1208 may be assumed to be predominated by leisure travelers, and may therefore be charged the low amount. After the threshold date 1208, demand may be predominated by non-leisure bookings 1214. Accordingly, a high amount region 1216 may be defined after the threshold date 1208. Bookings made after the threshold date 1208 may be charged the higher amount.

In order to maximize profits, the hotel manager may wish to maximize the number of higher-paying non-leisure travelers that can be accommodated. If the hotel has sufficient capacity, then all of the travelers, non-leisure and leisure, may be allowed to book rooms. However, in some circumstances the hotel may not be able to accommodate all travelers that wish to book rooms, as shown in FIGS. 12B-12C. In this example, there is demand for 120 hotel rooms on a given date. Of this demand, 40 rooms are demanded by non-leisure travelers 1202, who are willing to pay $250 per might. 80 rooms are demanded by leisure travelers 1204, who are willing to pay $150 per night. However, the hotel only has 100 rooms of capacity 1206.

Thus, 20 travelers cannot be accommodated in the hotel. As shown in FIG. 12C, in order to maximize revenue in this scenario the hotel should optimally accept all of the 40 non-leisure travelers 1252. This leaves a pool 1258 of 20 rejected leisure travelers. However, the hotel's booking policy must be properly established in order to achieve this outcome. For example, consider a scenario in which travelers are accepted at the hotel based on a first-come-first-served policy. Because leisure travelers 1252 typically book early, before the non-leisure travelers 1254, the hotel would accept all 80 of the leisure travelers 1254, and would then be forced to reject 20 of the non-leisure travelers 1254.

Accordingly, the hotel manager may wish to stop booking leisure travelers 1254 at a certain point in order to leave room for anticipated future non-leisure travelers 1252. This may be accomplished, for example, by setting the threshold date 1208 (FIG. 12A) earlier or later. Such a policy is based on the assumption that leisure travelers 1254 will not pay the higher amount for the hotel room, thus leaving room for non-leisure travelers 1252 who will.

As noted above, accurately setting this policy may require that in-house activity be accounted for (e.g., by the application of the aggregated in-house activity profiles described in connection with FIG. 11). A technique for building aggregated in-house activity profiles is next described with reference to FIGS. 13A-13E.

Figure 13A:
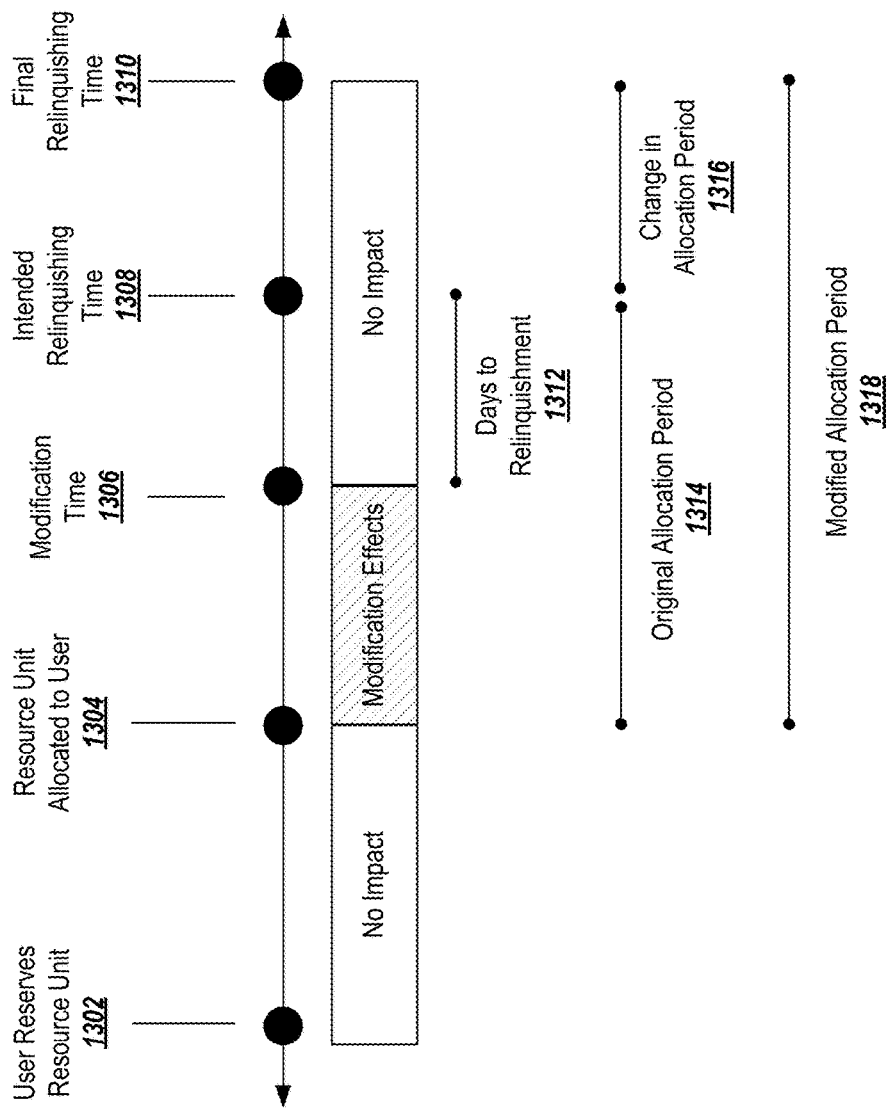
FIGS. 13A-13E illustrate timelines of resource allocation and the effect of modifications to the allocation period according to some embodiments of the present technology.

FIG. 13A depicts a timeline of the allocation of a given resource unit. The timeline shows a time 1302 at which a user reserves the resource unit (e.g., the time at which a user requests that a library book be held for them, or the time at which a user reserves a hotel room). The reservation may include an amount of time during which the resource is allocated to the user. This allocation period may run from a time 1304 at which the resource unit is actually allocated to the user (e.g., indicating that the user picked up the book or checked into the hotel room) until a time 1308 at which the user intends to relinquish the resource (e.g., returning the library book or checking out of the hotel room). At a time 1306, the user attempts to modify the reservation, in this case by extending the reservation to a final relinquishing time 1310 later than the intended relinquishing time 1308.

The historical data maintained by the above-described policy management system (FIG. 11) typically accounts for user reservations and is able to use demand forecasting to predict demand for the resource. Thus, the policy management system has already factored in the allocation of the resource unit from the reservation time 1302 until the time at which the resource is allocated 1304 through demand forecasting. Similarly, once the modification is made, the historical data may be updated to reflect the new allocation of the resource.

However, neither the historical data nor the demand forecasting reflects modification effects after the unit has been allocated (time 1304) but before the user attempts to modify the allocation (time 1306). Therefore, in the time between times 1304 and 1306, the historical data is biased in favor of non-allocation. More generally, if (in the in-house activity) extensions dominate early relinquishment then the policy management system will under-forecast the resource demand. On the other hand, if early relinquishments dominate extensions, then the resource demand will be over-forecasted.

There is therefore a modification effect to be accounted for in this time period, whereas the other time periods do not carry a modification effect.

The present inventors have identified several factors that impact the probability of modification and the expected amount of the modification. For example, whether the user extends the allocation period, and (if they extend) the amount of changed allocation period 1316 may be functions of, or may be explained by, the original intended allocation period 1314 and amount of time 1312 remaining until to the original intended relinquishing time 1308. The total amount of time 1318 that the resource is allocated to the user is represented by the original allocation period 1314 plus the change in the allocation period 1316.

In addition, different types or categories of users may have different extension patterns. For example, the longer the original allocation period 1314, the more likely that a user will extend for longer (e.g., a larger changed allocation period 1316). Similarly, a user who extends for a longer period of time (i.e., a relatively large change in allocation period 1316) is more likely to extend earlier (e.g., to have a longer period of time to relinquishment 1312 when they extend; in other words, earlier extensions are more likely to extend longer).

Early relinquishment behavior is similarly complex and affected by various patterns. The main difference of early relinquishment from extension is that the forecasting impact is in opposite direction.

Figure 13B:
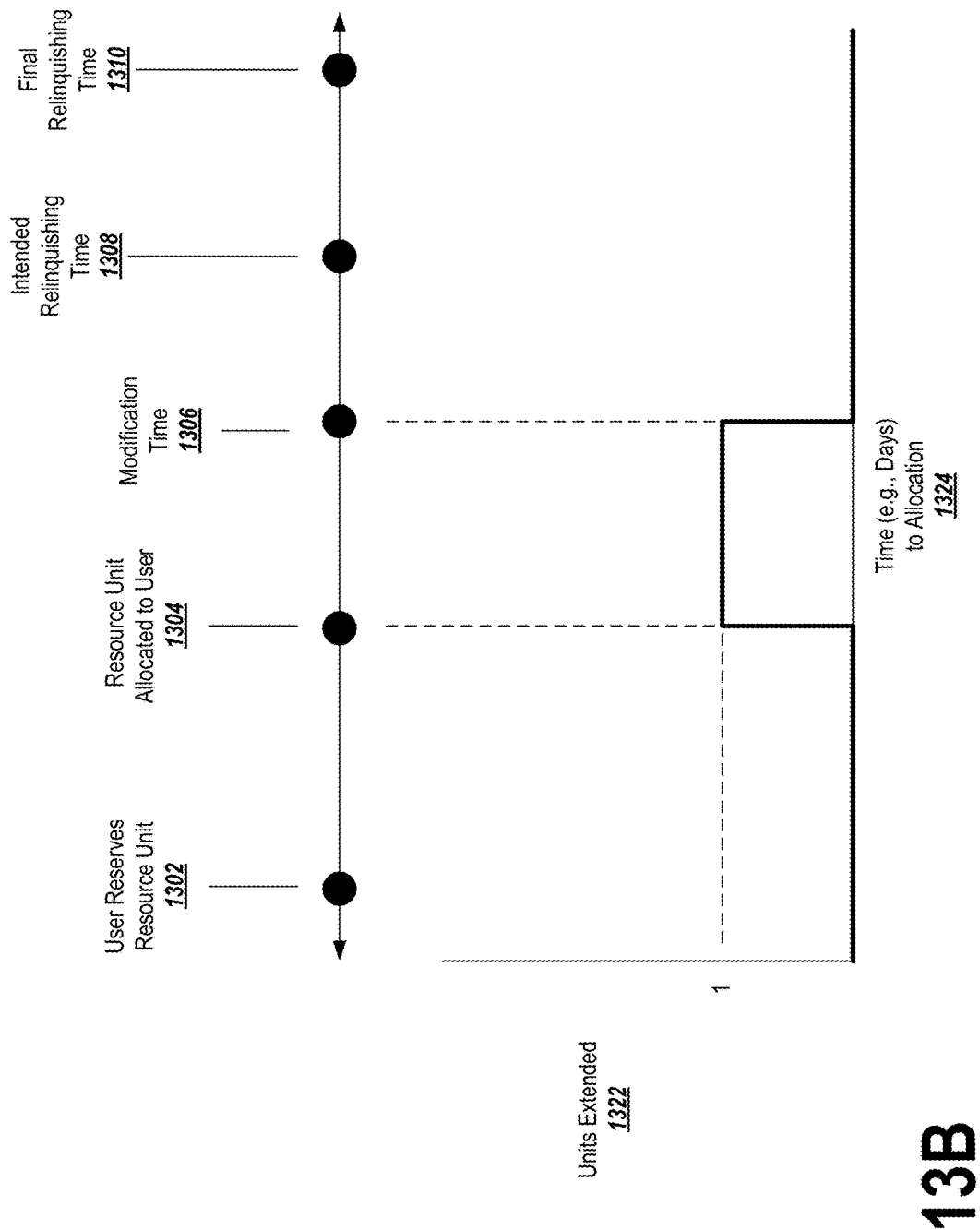

The modification effect in the in-house activity data as reflected in FIG. 13A may be plotted, as shown in FIG. 13B. In this example, a graph showing the time to allocation 1324 versus the number of units extended 1322 is presented. As shown in this graph, there is a modification effect pertaining to a single unit of the resource between the times 1304 and 1306.

Figure 13C:
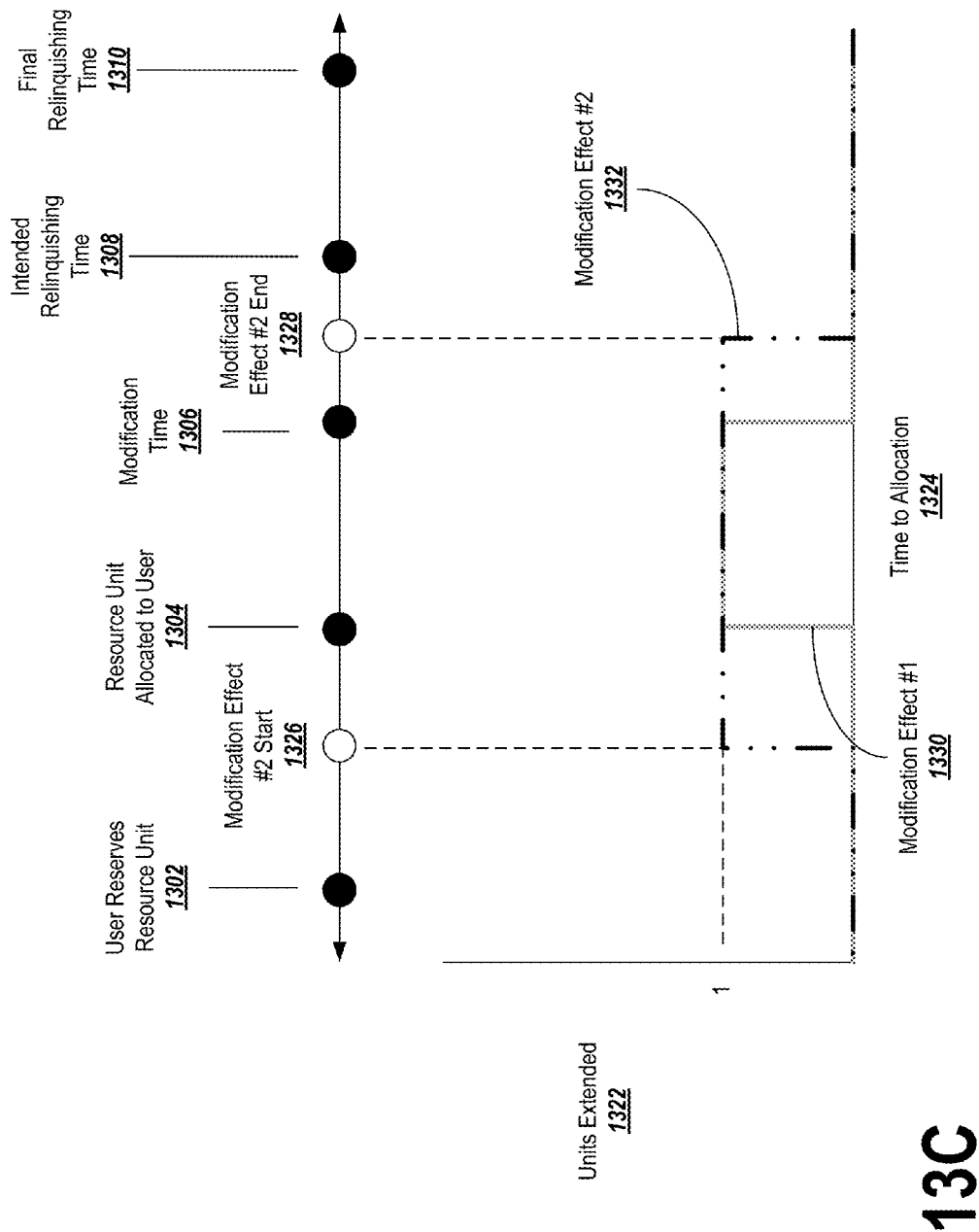

Assume that a second user reserves another unit of the resource and extends the reservation after the unit is allocated. FIG. 13C depicts a simplified example in which the extension effect for the second user is also reflected on the timeline. The extension effect is calculated in the same manner as for FIG. 13B, and runs from a second modification effect start time 1326 to a second modification effect end time 1328. The graph shows the modification effect 1330 of the first user, and the modification effect 1332 of the second user.

Note that not all modification effects will necessarily be positive. If a user reduces the length of their stay, for example, then the modification effect might involve subtracting a unit from the number of units extended. This approach also implicitly handles the early departure behavior. The in-house aggregated profile takes negative values when early departure dominates the extensions, and positive otherwise.

Figure 13D:
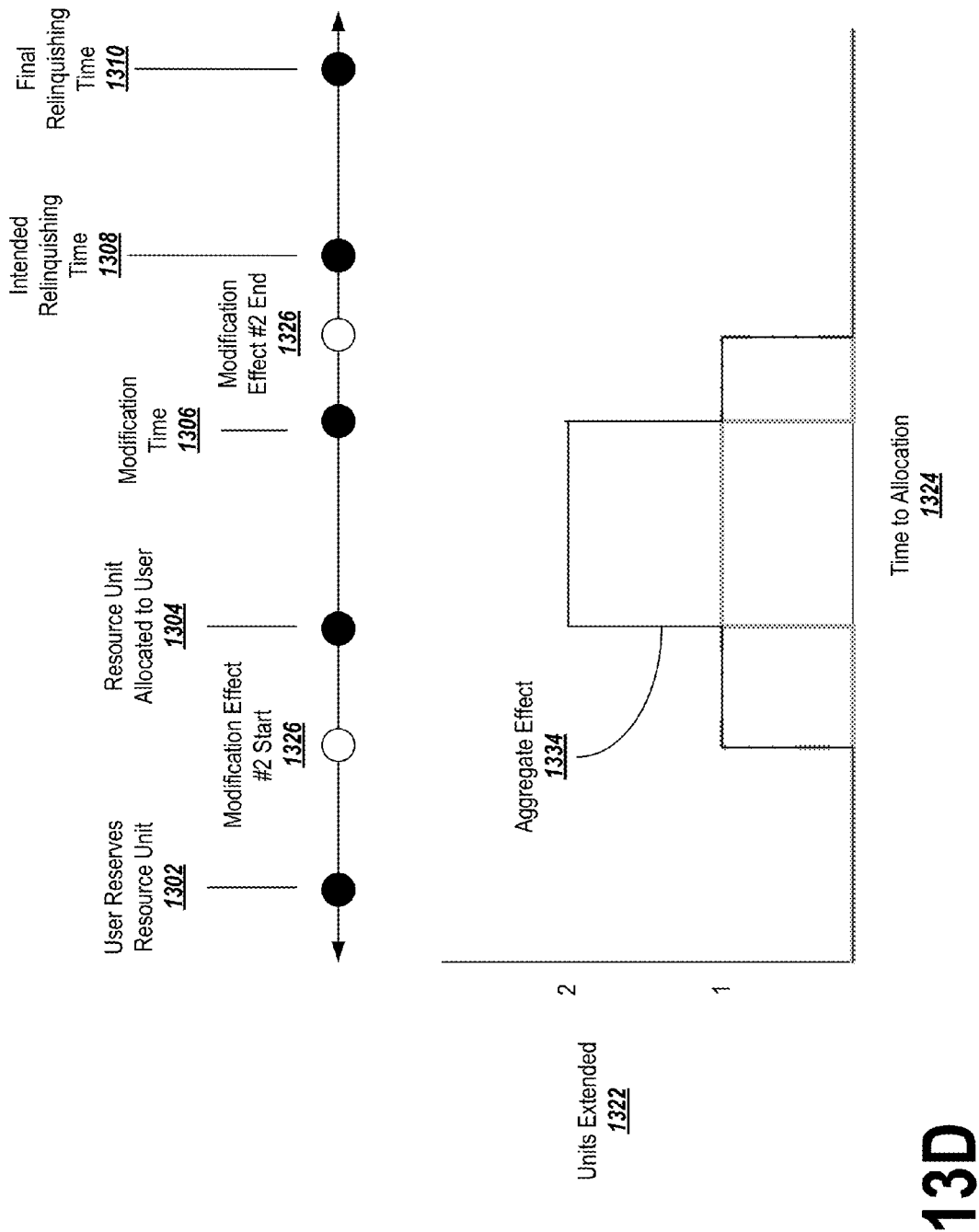

The modification effects may be accumulated to generate an aggregate effect 1334, as shown in FIG. 13D. In this example, the first modification effect is added to the second modification effect to generate an aggregate effect 1334. As shown in this example, a single-unit extension effect exists from the time 1326 until the time 1304. Between the time 1304 and the time 1306, a two-unit extension effect exists, and between the time 1326 and the time 1308, a single-unit extension effect exists.

Figure 13E:
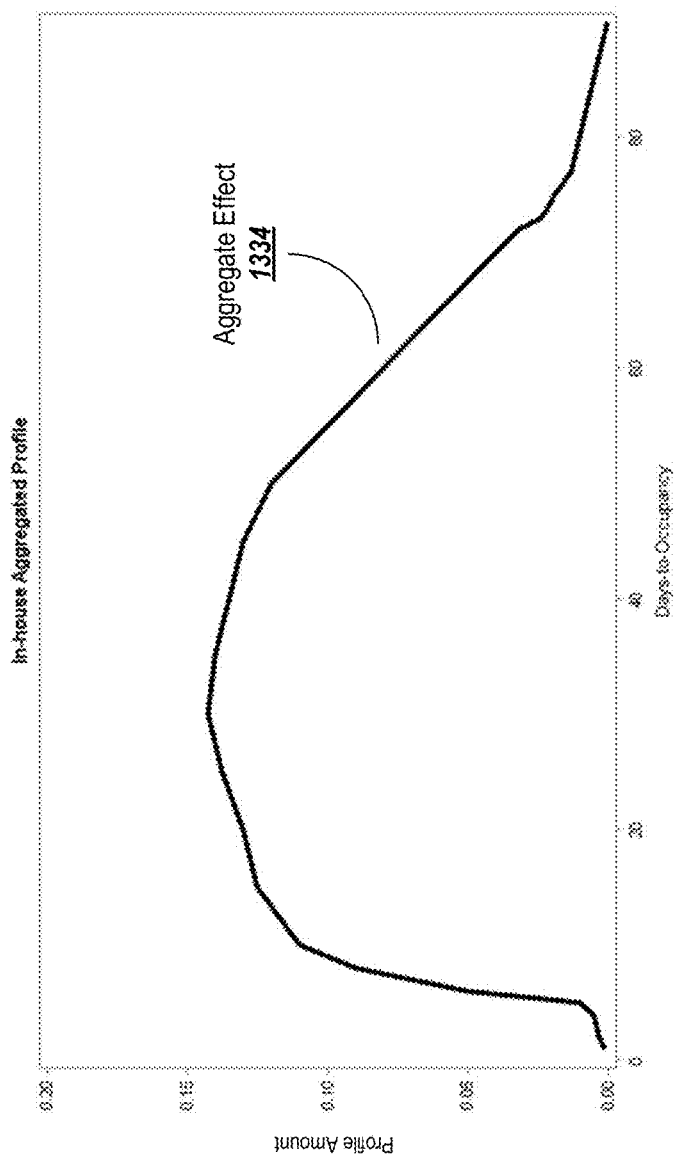

As more extension effects are aggregated, the graph may become more detailed and may better reflect the extension activity. The aggregated effect may be normalized to the total amount of allocation period for a given date (e.g., the proportion of allocated resource units that are due to extension effects based on the amount of time until a given date). For example, FIG. 13E depicts an aggregate effect curve when multiple extension effects are accumulated and normalized.

The profiles may also be estimated separately for different user segments, resource categories, day-of-week (DOW), season, special events, etc. in order to reflect the heterogeneity in the in-house activities across market segments, DOW, seasons, special events, etc.

The in-house aggregated profile may then be created by averaging all the normalized aggregate effect curves over all allocation dates in the available history. This approach ensures that all the relevant information regarding the original amount of allocation period, the updated amount of allocation period, and the time of extension is preserved by simplifying the estimation and forecasting process. This approach greatly reduces the dimensionality of the problem.

Figure 14A:
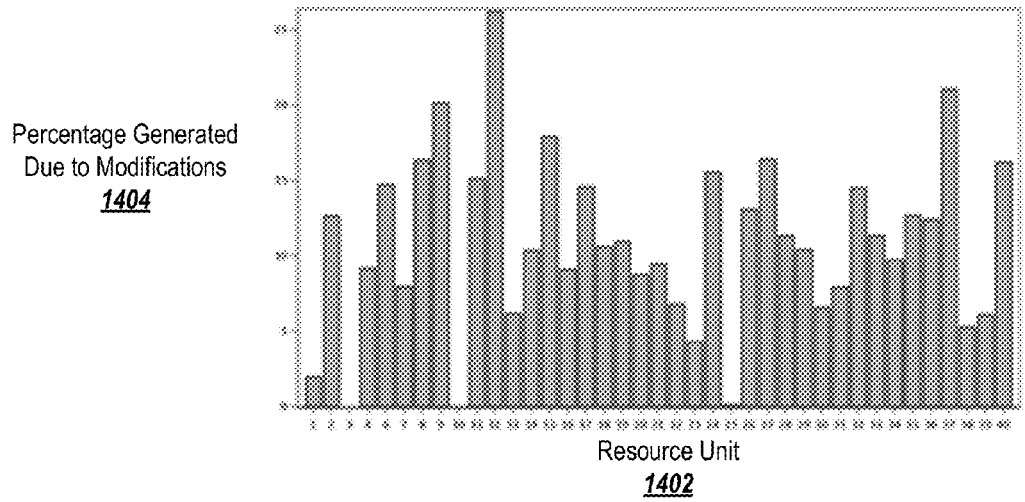
FIG. 14A-14B illustrates graphs of modification effects relating to allocation of a resource, according to some embodiments of the present technology.

The aggregated extension effect may also be represented as a percentage of final allocations as function of days to allocation. The percentages may be broken down by resource unit or by groups of resource units. For example, FIG. 14A depicts the percentage of unit/time allocations (e.g., hotel room-nights) 1404 generated due to modifications (extensions or reductions) as a function of a resource ID 1402. As can be seen in FIG. 14A, some resource units are associated with no extensions, whereas other units are associated with a high percentage of allocated units that are due to extensions.

Figure 14B:
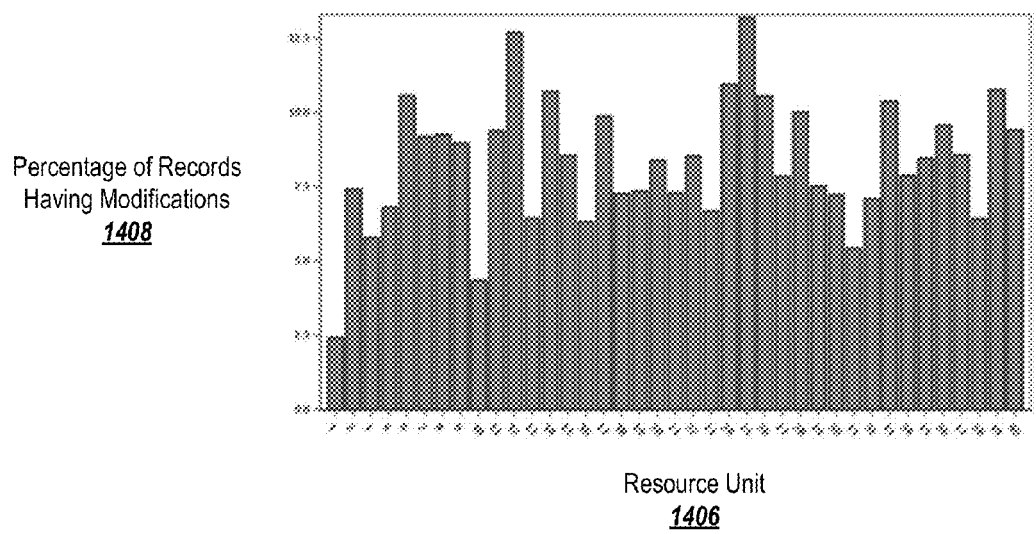

A high or low percentage of extensions may be due to different scenarios, and it may be helpful to be able to identify these different scenarios when performing demand forecasting or in-house activity modeling. For example, FIG. 14B depicts the percentage of records having modifications 1408 as a function of resource ID 1402. As shown in this example, some resource units have very few modification requests, while others have a great deal of modification requests.

Figures 15A, 15B:
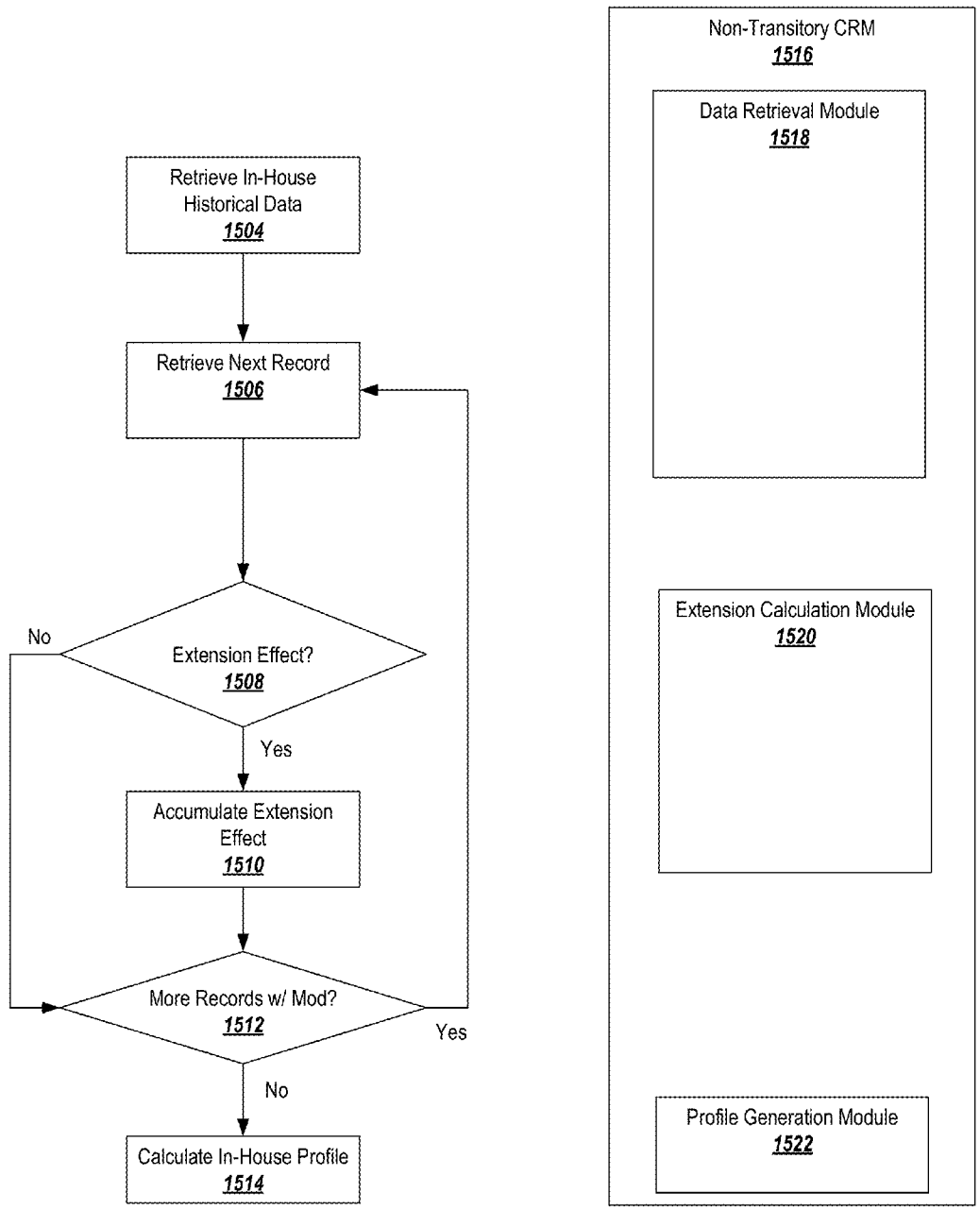
FIG. 15A-15B illustrate flowcharts of exemplary extension effect determination processes and a block diagram of logic for performing the processes according to some embodiments of the present technology.

These effects may be accounted for when generating the aggregated in-house profile. FIG. 15A is a flowchart providing a high-level overview of an exemplary logic flow for a profile generation process. FIG. 15B depicts exemplary computing modules embodied as instructions stored on a non-transitory computer readable medium 1516 for performing the logic flow described in FIG. 15A. These two figures will be described together below.

At block 1504, a system may retrieve in-house historical data 1504. The in-house historical data may include explicit or implicit records of extension requests and may be maintained on a remote storage device by an administrator or manager of a resource. At block 1506, the system may retrieve the next record from the historical data. Blocks 1504 and 1506 may be performed by a data retrieval module 1518 (FIG. 15B).

At block 1508, the system determines whether the current record was associated with a modification, and, if so, whether the modification gave rise to an extension effect that is not reflected in historical data accounted for by a policy management system. For example, in the situations described above, the extension effect is not reflected for a period of time after the resource is allocated until the time at which the modification request is received. The modification may be a request for an extension or a reduction in an allocation period during which the resource is allocated to a user.

If no extension effect occurs, then processing proceeds to block 1512. If an extension effect did occur, however, then at block 1510, the system may accumulate the extension effect. For example, the system may maintain a graph or data set reflecting the number of units extended over a time period, such as the graph depicted in FIGS. 13A-13E. Processing may then proceed to block 1512.

At block 1512, it is determined whether more records remain for evaluation. If so, then processing returns to block 1506 and the next record is retrieved. If not, processing proceeds to block 1514.

Blocks 1508-1512 may be performed by an extension calculation module 1520 (FIG. 15B).

At block 1514, an in-house profile may be calculated. For example, the accumulated extension effects from block 1510 may be normalized for a given allocation date, and the normalized aggregate effect curves may be averaged over all allocation dates in the available history. The resulting averaged curves may be used to calculate a probability of extension for a given resource unit or date. Block 1514 may be performed by a profile generation module 1522.

Figures 16A, 16B:
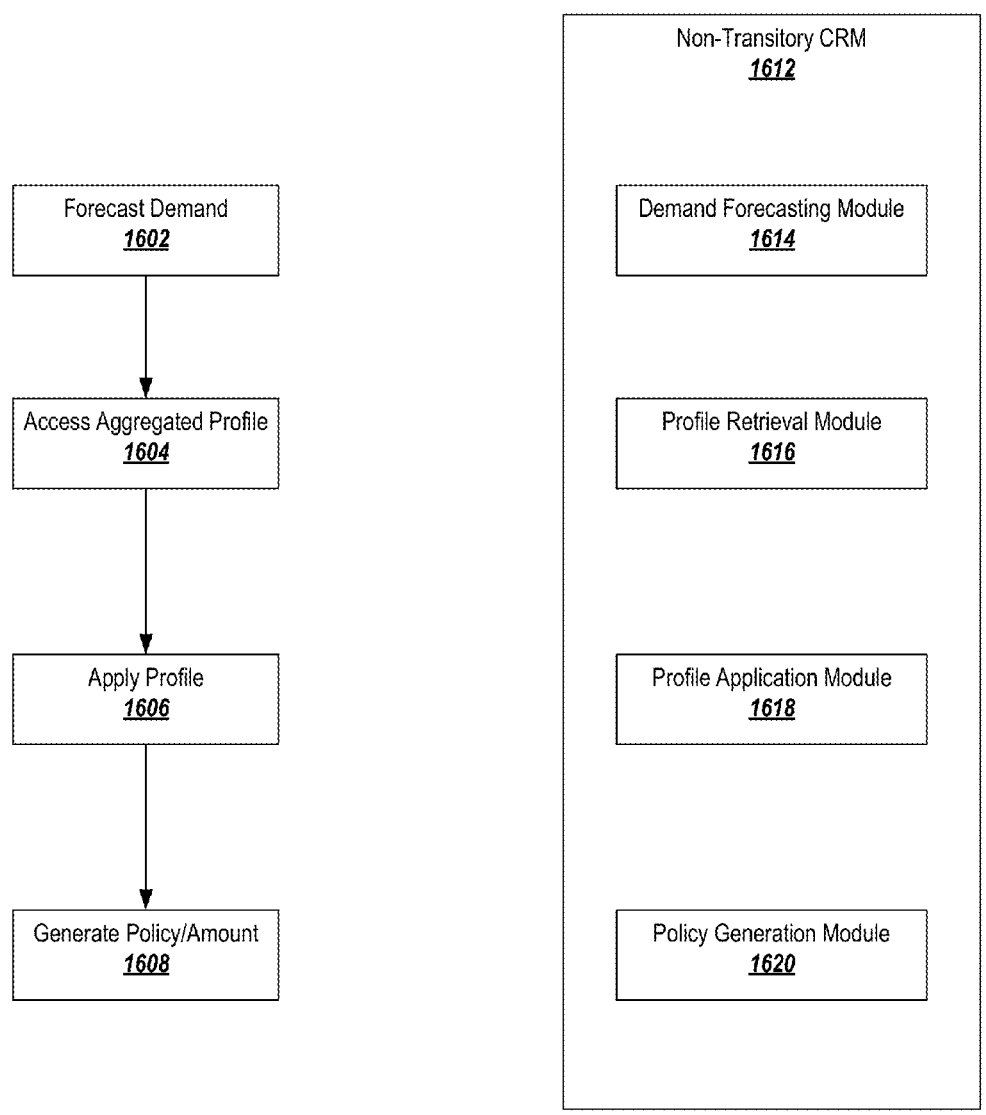
FIGS. 16A-16B illustrate flowcharts of exemplary resource allocation processes and a block diagram of logic for performing the processes according to some embodiments of the present technology.

The generated profile may be used to generate a policy, as shown in FIGS. 16A-16B. FIG. 16A depicts a policy generation procedure, whereas FIG. 16B depicts a non-transitory computer-readable medium 1612 storing instructions in the form of logic for performing the processing blocks shown in FIG. 16A.

At block 1602, a policy management system may forecast demand for a unit of a resource based on historical data. The demand forecast may be performed, for example, using a time series forecasting methodology. Block 1602 may be performed by a demand forecasting module 1614 (FIG. 16B).

At block 1604, the profile management system may access an aggregated in-house profile, such as the profile 1514 created in FIG. 15A. The profile may be stored locally at the profile management system, or remotely at an in-house system. Accessing the profile may involve retrieving the profile data directly, or sending a request that a remote system apply the curves or probabilities defined in the profile to the forecasted demand from block 1602. Block 1604 may be performed by a profile retrieval module 1616 (FIG. 16B).

At block 1606, the policy management system (or a remote system) may apply the profile to forecast net in-house extensions for a given future occupancy date. For example, the net in-house activity may be forecast by multiply the occupancy forecasts by the profile value of the corresponding time-to-allocation in the in-house profile, because the in-house profile is normalized with respect to resource unit/time values (e.g., hotel room-nights). The policy management system may treat extensions as auxiliary demand and early relinquishments as reductions or cancellations of reservations. Block 1606 may be performed by a profile application module 1618 (FIG. 16B).

At block 1608, the policy management system may use the forecasted extensions to generate a policy. For example, the policy may involve setting one or more parameters associated with the resource based on one or more metrics. The parameters may involve, for example, an indication of how much of a resource to make available per user and/or per category of users at a given time; the amount at which the resource will be offered to a user or category at a given time; an amount a user will need to offer to modify a resource allocation; or an indication of a level of overbooking that will be accommodated for a given user, category, or overall for a given time. Block 1608 may be performed by a policy generation module 1620 (FIG. 16B).

Figure 17:
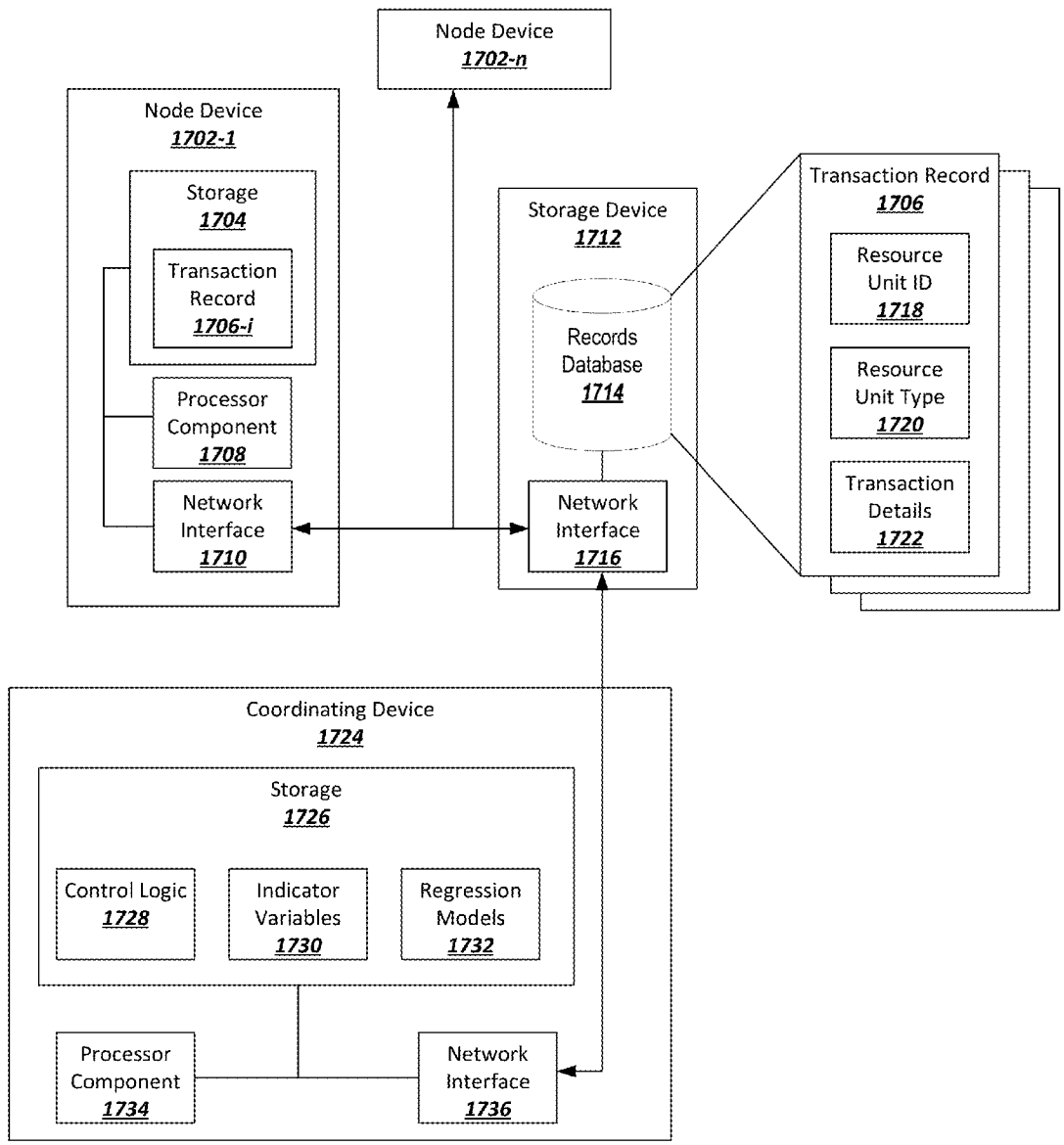
FIG. 17 illustrates an exemplary block diagram of a system suitable for practicing exemplary embodiments, according to some embodiments of the present technology.

The above-described techniques may be performed in a distributed system, in which records of individual transactions are stored at one or more locations and processed remotely. FIG. 17 illustrates an exemplary block diagram of a distributed system suitable for practicing exemplary embodiments, according to some embodiments of the present technology.

The system includes one or more node devices 1702-1, . . . 1702-*n*. The node devices may be, for example, computing devices that store transaction records 1706-*i* for a given resource, such as a library or hotel. The transaction records 1706-I may be stored in a storage 1704. The node devices 1702 may further include a processor component 1708 for reading and writing the transactions records 1706-*i* in the storage 1704 and for interacting with a network interface 1710 to receive and respond to network requests for data, among other possibilities.

The node devices 1702 may optionally interact with each other, and/or may interact with a storage device 1712 via the storage device's network interface 1716. The storage device 1712 may store the collective transaction records 1706 from the node devices 1702 in a records database 1714. The transaction records 1706 may include (in an exemplary embodiment), a resource unit ID 1718 which identifies a particular unit of a resource to which this transaction pertains. The transaction records 1706 may further include a resource unit type 1720, which assigns the resource unit to one or more of a plurality of categories (e.g., king-size room, standard room, suite). The transaction records 1706 may also include other details of the transaction 1722, such as the date on which the transaction was carried out, the date of the reservation for the unit of the resource, the amount assigned to the transaction, etc.

A coordinating device 1724 may retrieve the transaction records 1706 and may generate or apply in-house activity profiles and/or may perform demand forecasting. The coordinating device 1724 may request and retrieve the records from the storage device 1712 using the coordinating device's network interface 1736. A processor component 1734 may be programmed with instructions to unconstrain the data, such as instructions for performing the operations depicted in FIGS. 15A and 16A.

The coordinating device 1724 may store various structures and instructions to allow the processor component to perform these operations. For example, the storage 1726 may store control logic implementing the modules depicted in FIG. 15B or 16B.

In various embodiments, each of the processor components 1708, 1734 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked.

By way of example, the processor components 1708, 1734, etc. may incorporate a single-instruction multiple-data (SIMD) architecture, may incorporate multiple processing pipelines, and/or may incorporate the ability to support multiple simultaneous threads of execution per processing pipeline.

In various embodiments, each of the storages 1704, 1712, and 1726 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the network interfaces 1710, 1716, and 1736 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.11x, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, 5G, etc.

In some embodiments, an apparatus may include a processor and a storage to store instructions that, when executed by the processor, cause the processor to forecast use of a resource divided into a predetermined number of units based on prior demand for the units of the resource, the units of the resource capable of being allocated to one or more users for an occupancy period that begins at an occupation time;

The instructions may further cause the processor to access an profile that accounts for a modification to the allocation period of the resource by a plurality of users, the modification associated with a modification time at which the modification is requested, the profile accounting for the modification of the allocation period as a function of the original occupancy period and a number of days left until an originally-scheduled end of the occupancy period, or accounting for the modification of the occupancy period based on a probability of receiving a request to modify the occupancy period and an expected amount of the modification. The profile may adjust the forecasted demand based on extension effects that occur solely after the allocation time or before the modification time.

The modification may be a request to extend the allocation period or a request to reduce the allocation period. The modification of the allocation period may be based on an expected amount of the modification. The profile may account for a plurality of different user segments, wherein the expected amount of the modification is configured to be greater for a user segment associated with a shorter period of time between the occupation time and the modification time relative to another user segment. Alternatively or in addition, the probability and the expected amount of the modification may be configured to be greater for user segments associated with a longer occupancy period relative to another user segment.

The instructions may cause the processor to calibrate the profile using in-house historical activity data. The profile may be calibrated based on at least one of a season, a day of the week, or a special event.

The instructions may further cause the processor to apply the profile to the forecasted demand to increase or reduce the forecasted use based on extension effects that occur between the occupation time and the modification time.

The instructions may further cause the processor to adjust one or more parameters associated with allocation of the resource to account for the increased or reduced forecasted use.

The instructions may further cause the processor to generate an amount or a rate associated with an extension request based on the increased or reduced forecasted demand.

Other embodiments may be in the form of a computer-implemented performing any combination of the above-described actions, or a non-transitory tangible computer-readable medium storing instructions for performing any combination of the above-described actions.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising a processor component and a storage to store instructions that, when executed by the processor component, cause the processor component to:
   forecast demand for a resource divided into a predetermined number of units, the forecasting performed based on prior demand for the units of the resource, the units of the resource capable of being allocated to one or more users for an occupancy period that begins at an occupation time;
   access a profile that accounts for modification, the modifications made by a plurality of users, to the occupancy period of the resource, each modification associated with a modification time at which the modification is requested by a user of the plurality of users, the profile accounting for the modification of the occupancy period as a function of the original occupancy period and an amount of time left until an originally-scheduled end of the occupancy period, or accounting for the modification of the occupancy period based on a probability of receiving a request to modify the occupancy period and an expected amount of the modification;
   apply the profile to the forecasted demand to determine if the forecasted demand is below an unconstrained demand or above an unconstrained demand based on extension effects that occur between the occupation time and the modification time; and
   adjust one or more parameters associated with allocation of the resource to increase allocation of the resource when the forecasted demand is determined to be below the unconstrained demand, or adjust the one or more parameters to decrease allocation of the resource when the forecasted demand is determined to be above the unconstrained demand.

2. The apparatus of claim 1, the modification being a request to extend the occupancy period or a request to reduce the occupancy period.

3. The apparatus of claim 1, the profile adjusting the forecasted demand based on extension effects that occur solely after the occupation time or before the modification time.

4. The apparatus of claim 1, the instructions further comprising instructions that, when executed by the processor component, cause the processor component to calibrate the profile using in-house historical activity data.

5. The apparatus of claim 1, the modification of the occupancy period based on an expected amount of the modification, the profile accounting for a plurality of different user segments, wherein the expected amount of the modification is configured to be greater for a user segment associated with a shorter period of time between the occupation time and the modification time relative to another user segment.

6. The apparatus of claim 1, the profile accounting for a plurality of different user segments, wherein the probability and the expected amount of the modification are configured to be greater for user segments associated with a longer occupancy period relative to another user segment.

7. The apparatus of claim 1, the instructions further comprising instructions that, when executed by the processor component, cause the processor component to generate a rate associated with an extension request based on the increased or reduced forecasted demand.

8. The apparatus of claim 1, the profile being calibrated based on at least one of a season, a day of the week, or a special event.

9. The apparatus of claim 1, the units of the resource being hotel rooms.

10. A computer-program product tangibly embodied in a non-transitory machine-readable storage medium, the computer-program product including instructions operable to cause a processor component to perform operations including:
   forecasting demand for a resource divided into a predetermined number of units, the forecasting performed based on prior demand for the units of the resource, the units of the resource capable of being allocated to one or more users for an occupancy period that begins at an occupation time;
   accessing a profile that accounts for modification, the modifications made by a plurality of users, to the occupancy period of the resource, each modification associated with a modification time at which the modification is requested by a user of the plurality of users, the profile accounting for the modification of the occupancy period as a function of the original occupancy period and an amount of time left until an originally-scheduled end of the occupancy period, or accounting for the modification of the occupancy period based on a probability of receiving a request to modify the occupancy period and an expected amount of the modification;
   applying the profile to the forecasted demand to determine if the forecasted demand is below an unconstrained demand or above an unconstrained demand based on extension effects that occur between the occupation time and the modification time; and
   adjusting one or more parameters associated with allocation of the resource to increase allocation of the resource when the forecasted demand is determined to be below the unconstrained demand, or adjust the one or more parameters to decrease allocation of the resource when the forecasted demand is determined to be above the unconstrained demand.

11. The computer-program product of claim 10, the modification being a request to extend the occupancy period or a request to reduce the occupancy period.

12. The computer-program product of claim 10, the profile adjusting the forecasted demand based on extension effects that occur solely after the occupation time or before the modification time.

13. The computer-program product of claim 10, the instructions further comprising instructions that, when executed by the processor component, cause the processor component to calibrate the profile using in-house historical activity data.

14. The computer-program product of claim 10, the modification of the occupancy period based on an expected amount of the modification, the profile accounting for a plurality of different user segments, wherein the expected amount of the modification is configured to be greater for a user segment associated with a shorter period of time between the occupation time and the modification time relative to another user segment.

15. The computer-program product of claim 10, the profile accounting for a plurality of different user segments, wherein the probability and the expected amount of the modification are configured to be greater for user segments associated with a longer occupancy period relative to another user segment.

16. The computer-program product of claim 10, the instructions further comprising instructions that, when executed by the processor component, cause the processor component to generate a rate associated with an extension request based on the increased or reduced forecasted demand.

17. The computer-program product of claim 10, the profile being calibrated based on at least one of a season, a day of the week, or a special event.

18. The computer-program product of claim 10, the units of the resource being hotel rooms.

19. A computer-implemented method comprising:
   forecasting demand for a resource divided into a predetermined number of units, the forecasting performed based on prior demand for the units of the resource, the units of the resource capable of being allocated to one or more users for an occupancy period that begins at an occupation time;
   accessing a profile that accounts for modification, the modifications made by a plurality of users, to the occupancy period of the resource, each modification associated with a modification time at which the modification is requested by a user of the plurality of users, the profile accounting for the modification of the occupancy period as a function of the original occupancy period and an amount of time left until an originally-scheduled end of the occupancy period, or accounting for the modification of the occupancy period based on a probability of receiving a request to modify the occupancy period and an expected amount of the modification;
   applying the profile to the forecasted demand to determine if the forecasted demand is below an unconstrained demand or above an unconstrained demand based on extension effects that occur between the occupation time and the modification time; and
   adjusting one or more parameters associated with allocation of the resource to increase allocation of the resource when the forecasted demand is determined to be below the unconstrained demand, or adjust the one or more parameters to decrease allocation of the resource when the forecasted demand is determined to be above the unconstrained demand.

20. The method of claim 19, the modification being a request to extend the occupancy period or a request to reduce the occupancy period.

21. The method of claim 19, the profile adjusting the forecasted demand based on extension effects that occur solely after the occupation time or before the modification time.

22. The method of claim 19, further comprising calibrating the profile using in-house historical activity data.

23. The method of claim 19, the modification of the occupancy period based on an expected amount of the modification, the profile accounting for a plurality of different user segments, wherein the expected amount of the modification is configured to be greater for a user segment associated with a shorter period of time between the occupation time and the modification time relative to another user segment.

24. The method of claim 19, the profile accounting for a plurality of different user segments, wherein the probability and the expected amount of the modification are configured to be greater for user segments associated with a longer occupancy period relative to another user segment.

25. The method of claim 19, further comprising generating a rate associated with an extension request based on the increased or reduced forecasted demand.

26. The method of claim 19, the profile being calibrated based on at least one of a season, a day of the week, or a special event.

27. The method of claim 19, the units of the resource being hotel rooms.

* * * * *